United States Patent
Wood et al.

(10) Patent No.: US 8,873,929 B1
(45) Date of Patent: Oct. 28, 2014

(54) DIGITAL RECORDING AND PLAYBACK

(75) Inventors: Anthony Wood, Palo Alto, CA (US);
Spencer Shanson, Mountain View, CA (US); Matthew Self, Redwood City, CA (US); Donald Woodward, Jr., Los Altos, CA (US); Douglas Shannon, Mtn View, CA (US); Mark Nudelman, Half Moon Bay, CA (US); Karl Townsend, Los Altos, CA (US); Edward Kessler, Los Gatos, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 3678 days.

(21) Appl. No.: 10/339,012

(22) Filed: Jan. 8, 2003

Related U.S. Application Data

(63) Continuation of application No. 09/262,144, filed on Mar. 3, 1999, now abandoned, which is a continuation of application No. 09/132,690, filed on Aug. 11, 1998, now abandoned.

(51) Int. Cl.
*H04N 5/92* (2006.01)

(52) U.S. Cl.
USPC ........................................ 386/238; 386/235

(58) Field of Classification Search
USPC ............................................ 386/52, 46, 109
See application file for complete search history.

(56) References Cited

U.S. PATENT DOCUMENTS

| | | | | |
|---|---|---|---|---|
| 5,150,407 A * | 9/1992 | Chan | .............................. | 713/178 |
| 5,761,373 A * | 6/1998 | Yamamoto | ..................... | 386/125 |
| 5,802,068 A * | 9/1998 | Kudo | ............................. | 370/538 |
| 6,058,242 A * | 5/2000 | Kim | ................................. | 386/83 |
| 6,169,844 B1 * | 1/2001 | Arai | ................................ | 386/83 |
| 6,253,024 B1 * | 6/2001 | Shima | ........................... | 386/235 |
| 6,262,776 B1 * | 7/2001 | Griffits | ......................... | 348/512 |
| 6,266,817 B1 * | 7/2001 | Chaddha | ...................... | 725/146 |
| 6,275,537 B1 * | 8/2001 | Lee | .......................... | 375/240.28 |
| 6,332,058 B1 * | 12/2001 | Kawakami | .................... | 386/111 |
| 6,363,204 B1 * | 3/2002 | Johnson et al. | ................ | 386/46 |
| 6,397,311 B1 * | 5/2002 | Capps | ........................... | 711/165 |
| 7,272,298 B1 * | 9/2007 | Lang et al. | ..................... | 386/83 |
| 2001/0042165 A1 * | 11/2001 | Ikeda | ............................ | 711/112 |
| 2002/0100044 A1 * | 7/2002 | Daniels | ........................... | 725/39 |

* cited by examiner

*Primary Examiner* — William C Vaughn, Jr.
*Assistant Examiner* — Eileen Adams
(74) *Attorney, Agent, or Firm* — McDonnell Boehnen Hulbert & Berghoff LLP

(57) ABSTRACT

Apparatus and corresponding methods for storing video information. The apparatus includes a means for receiving video information, a means for converting the received video information into digital video information, and a means for storing the digital video information. Converting the received video information into digital video information can include converting it into an MPEG-compatible digital format. The apparatus can include an MPEG-compatible digital encoder, which can include separate audio and video MPEG encoders. The digital video information can be stored on an electromagnetically writable disk drive with an optimized MPEG file system (OMFS) configured to receive the digital video information and store the digital video information on the disk drive, where the OMFS is configured to divide the received digital video information into one or more packets, each packet having the same number of bytes as a sector on a disk in the disk drive. The OMFS can first accumulate one of the packets of digital video information in a cache memory. The OMFS, upon filling the cache memory with a completed packet of digital video information, then stores the completed packet on a single one of the sectors of the disk drive.

18 Claims, 12 Drawing Sheets

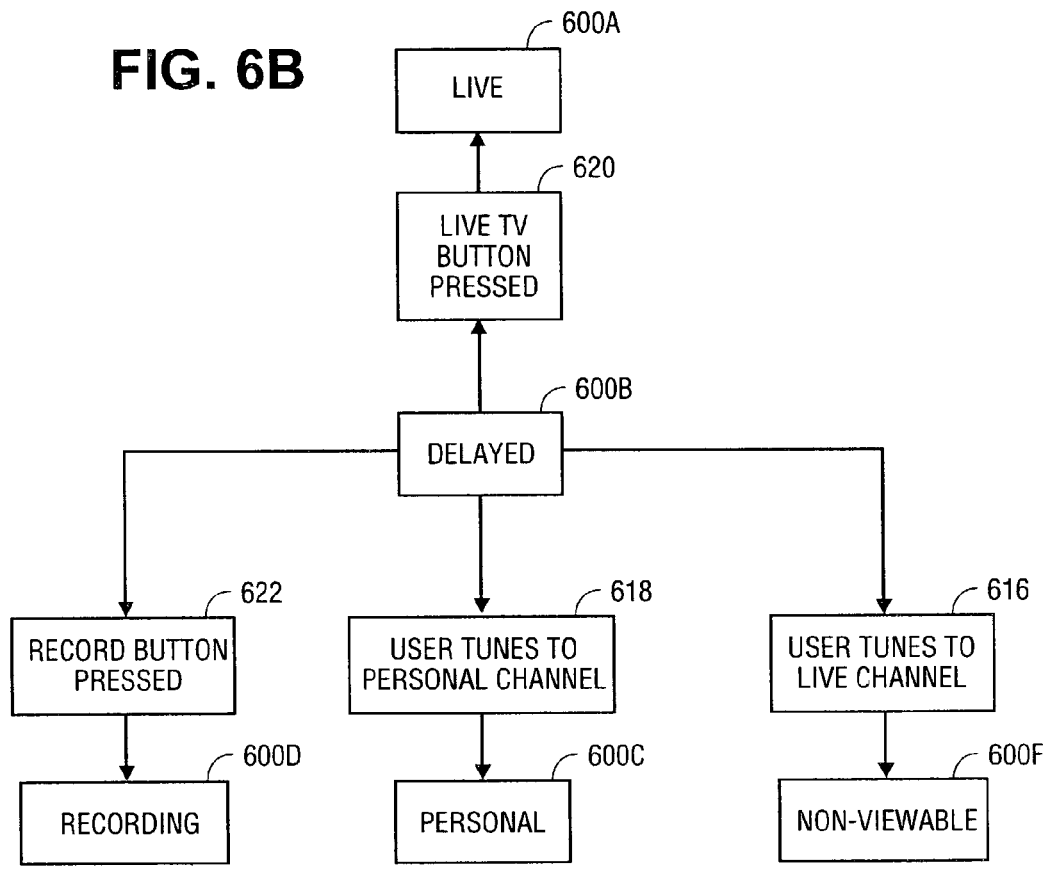

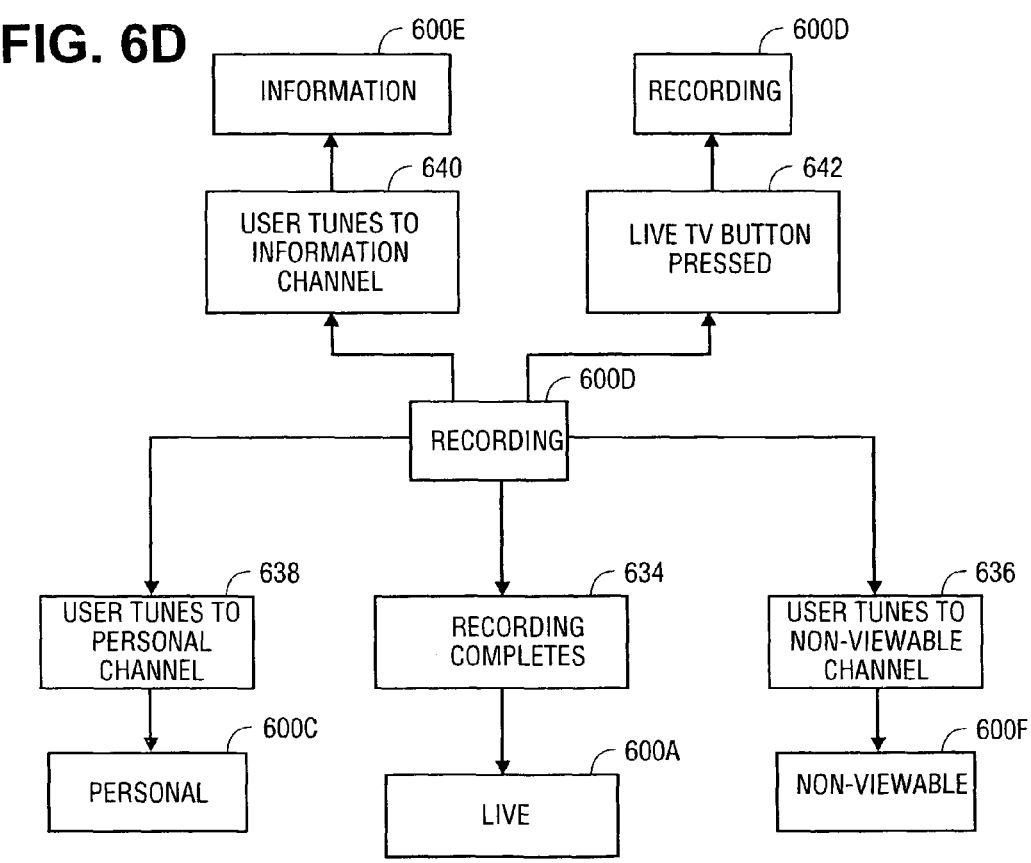

DIGITAL RECORDING AND PLAYBACK

RELATED APPLICATIONS

This application is a continuation application (and claims the benefit of priority under 35 U.S.C. §120) of U.S. patent application Ser. No. 09/262,144, entitled, "Digital Recording and Playback," filed on Mar. 3, 1999 now abandoned. U.S. patent application Ser. No. 09/262,144 is a continuation application (and claims the benefit of priority under 35 U.S.C. §120) of U.S. patent application Ser. No. 09/132,690, entitled, "Digital Recording and Playback," filed on Aug. 11, 1998 now abandoned.

BACKGROUND OF THE INVENTION

The present invention relates to digital recording and playback of audio and video streams.

Conventional video cassette recorders (VCRs) record in analog form a video stream received from a video source (e.g., a cable TV cable) onto a tape (e.g., a VHS tape). One way to record a video stream using a conventional VCR is to press a Record button, causing the VCR to begin recording the incoming video stream. The VCR continues recording until the user presses a Stop button. To schedule recording of a video stream (e.g., an upcoming episode of a television show), the user typically indicates the start time, end time, and television channel of the episode. The VCR begins recording the video stream received on the specified channel at the specified start time and stops recording at the specified end time. To play back a video stream recorded with a VCR, the user inserts the tape on which the video stream is recorded into the VCR, positions the tape to the beginning of the recorded video stream using Rewind and Forward buttons, and presses a Play button. Typically, a user must wait until recording has completed before a video stream can be played back.

A user who has access to live video sources such as a television antenna, a cable TV cable, or a Direct Broadcast Satellite (DBS) dish, and to recorded video sources such as a VCR or a camcorder, may connect the outputs of one or more such video sources to a conventional receiver. The user also connects a video display such as a television monitor to the receiver. The user can select which video source is to be output to the television monitor using controls provided by the receiver. For example, to view the output of the VCR (e.g., the contents of a VHS tape) on the television monitor, the user presses a "VCR" button on the receiver. To control the various video sources that are connected to the receiver (e.g., to tune to a particular channel from among the channels received through the television antenna), the user typically uses controls, such as remote controls, associated with the various video sources. Furthermore, each live television source typically has its own set of channels with its own numbering system. Channel numbers used by different live television sources may or may not overlap, and different video sources may or may not associate the same channel number with another channel which contains the same content (e.g., channels which correspond to the same television network).

Some live television providers, such as DBS and some cable systems, provide additional information within the video streams they provide. For example, some systems provide information about upcoming television shows, such as the times at which they are scheduled to air and the channels on which they appear. Some systems display such information using an on-screen menu that displays the times at which upcoming shows will be aired.

SUMMARY OF THE INVENTION

In general, in one aspect, the invention features apparatus and corresponding methods for storing video information. The apparatus includes a means for receiving video information, a means for converting the received video information into digital video information, and a means for storing the digital video information. Implementations of the invention can include one or more of the following advantageous features. Converting the received video information into digital video information includes converting it into an MPEG-compatible digital format. The means for converting the received video information into digital video information includes an MPEG-compatible digital encoder. The MPEG-compatible digital encoder includes separate audio and video MPEG encoders. The means for storing the digital video information includes an electromagnetically writable disk drive, and an optimized MPEG file system (OMFS) configured to receive the digital video information and store the digital video information on the disk drive. The disk drive includes one or more electromagnetic disks, each electromagnetic disk divided into one or more sectors having a fixed number of bytes storable on each sector; and the OMFS is configured to divide the received digital video information into one or more packets, each packet having the same number of bytes as a sector on a disk in the disk drive. The OMFS first accumulates one of the packets of digital video information in a cache memory. The OMFS, upon filling the cache memory with a completed packet of digital video information, then stores the completed packet on a single one of the sectors of the disk drive. The means for converting the received video information into digital video information includes an MPEG-compatible software encoder streamer which couples to the MPEG-compatible digital encoder to convert the received video information. The apparatus further includes a means for reading the stored the digital video information. The means for reading includes an MPEG-compatible digital decoder. The MPEG-compatible digital decoder includes separate audio and video MPEG decoders. The means for reading includes an MPEG-compatible software decoder streamer which couples to the MPEG-compatible digital decoder to convert the stored digital video information into video information suitable to be displayed on a television monitor. The OMFS is configured to defragment the disk drive periodically. The OMFS is configured to determine periodically poor sectors on the disk drive and prevent writing to the poor sectors.

Advantages of the invention may include one or more of the following. A user can exercise centralized control over multiple video sources. For example, by merging the live television channels provided by multiple live television sources such as television antennas, cable TV cables, and DBS dishes, a user can navigate a single contiguous list of channels. This simplifies the user's television viewing experience by, for example, allowing the user to select television channels using a single remote control and reducing or eliminating any confusion regarding content received from different television stations using the same channel number. More generally, the user is provided with the appearance of a single virtual video source, regardless of the number of video sources (live or recorded) that are connected to a digital VCR. Interacting with multiple video sources through a single consistent interface greatly simplifies the tasks performed by the user, such as recording television shows and selecting channels to view.

A user can also exercise VCR-style control over live television shows. For example, if the incoming video stream is recorded into a rewind buffer, the user can effectively "rewind" a live television show simply by pressing a Rewind button. The live television show continues to be recorded while it is being "rewound." This allows the user to re-watch parts of a live television show before the show is over. Similarly, the user can pause a live television show by pressing a Pause button. Even while paused, the live television show continues to be recorded. This allows the user to pause a live television show to perform other activities, and then resume watching the remainder of the television show even before the show is over. The ability to play back part of a show while the show is being recorded can also allow a user who sits down to watch a television show after it has begun being recorded to simply press the Play button to begin playing back the show from the beginning, even while the remainder of the show is still airing and being recorded.

A user can specify a show to record based on the content of the show and information associated with the show, rather than merely on the time at which the show airs and the channel on which it is received. For example, the user can specify that all episodes of a television show with a particular title be recorded. Specifying shows to be recorded by content can simplify the process of recording shows because it does not require the user to know when a show will be aired, or on what channel it will air, or from which video source it will be received. Furthermore, recording by content can reduce the probability that a show of interest to the user will fail to be recorded. If, for example, the show specified by the user is delayed or rescheduled, it can still be recorded. Recording by content also allows both new episodes of a television show broadcast on one channel and re-runs of the show broadcast on a different channel to be recorded easily.

Also, show information can be stored along with each recorded show. Such show information may include, for example, the name of the show, the time at which it aired, the channel on which it aired, and a description of the show. As a result, show information associated with a show can be displayed on-screen when a user plays back a recorded show. Furthermore, recording show information along with recorded shows can simplify the process of locating recorded shows. The user may, for example, be provided with an informative list of shows that have been recorded from which a show to view may be selected. The user need not keep an external record of which shows have been recorded and where they are located. Furthermore, stored show information may be used in conjunction with channel guide information to allow recording only those episodes of a television show which have not been previously recorded or which the user has not previously viewed.

Storage space can be managed efficiently by, for example, configuring the digital VCR to only retain in storage a certain number of recorded episodes of a particular television show. When the maximum number of episodes of a television show have been recorded, recorded episodes may be deleted from storage to make room for subsequent episodes. This both increases the likelihood that sufficient storage space will be available to record new shows, and relieves the user of managing storage space.

Other features and advantages of the invention will become apparent from the following description and from the claims.

BRIEF DESCRIPTION OF THE DRAWINGS

FIGS. 6A-F are block diagrams of transitions between interface states.

DETAILED DESCRIPTION

Figure 1:
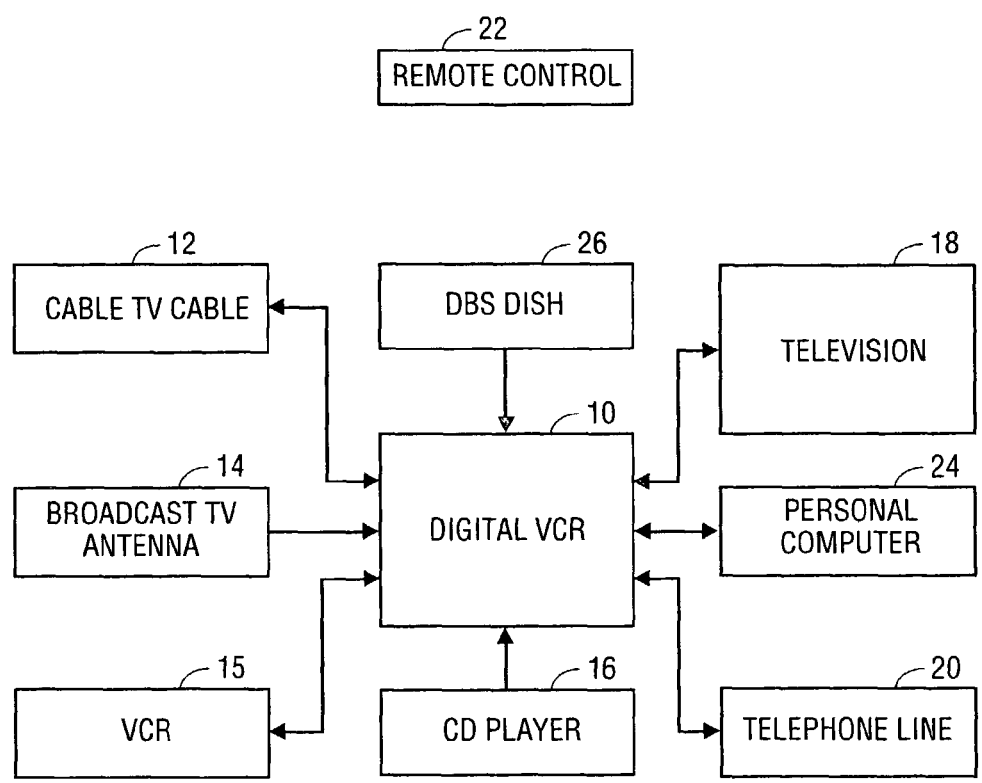
FIG. 1 is a block diagram of a digital VCR and devices connected to the digital VCR.

Referring to FIG. 1, a digital VCR 10 acts as a central station for recording and playback of analog and digital audio and video. Live video sources, such as a cable TV cable 12, a broadcast television antenna 14, and a DBS dish 26, recorded video sources such as a video cassette recorder (VCR) 15, and audio sources such as a CD player 16 may be connected to inputs of the digital VCR 10. A remote control 22 and on-screen menus displayed, by the digital VCR 10 on the television 18 may be used to select audio and video from one or more of the attached audio and video sources to be output to a single display device such as the television 18. In this way, the user may control all connected audio and video devices using a simple, natural, and unified interface provided by the digital VCR 10. For example, when viewing content that has been pre-recorded externally, such as content recorded on a VHS tape, commands such as fast forward and rewind received from the digital VCR's remote control 22 may be forwarded by the digital VCR 10 to the VCR 15. Alternatively, the remote control 22 can, for example, send commands such as fast forward and rewind directly to the VCR 15. In general, the user issues all commands using the remote control 22, which either forwards the commands directly to the appropriate devices, or forwards the commands to the digital VCR 10, which in turn forwards the commands to the appropriate devices.

The digital VCR 10 includes a modem 148 (FIG. 2) (RC336ACFA) which is connected to a telephone line 20 and which may be used to send and receive information about upcoming television shows and other information, as described in more detail below. The digital VCR 10 can be controlled by keys on a front panel, by a remote control 22, or by an external device such as a personal computer 24.

Figure 2:
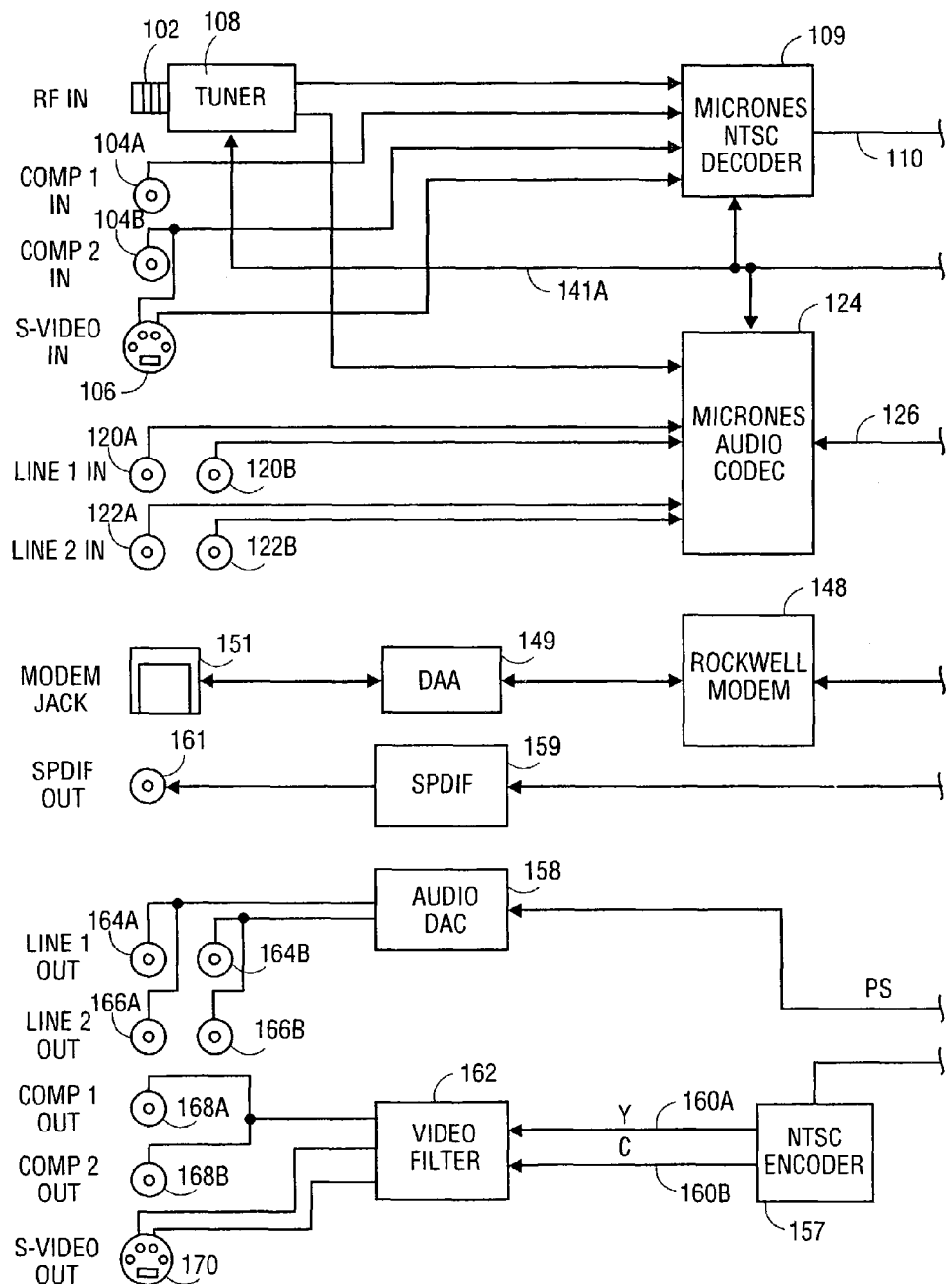
FIG. 2 is a block diagram of digital VCR circuitry.
Figure 2:
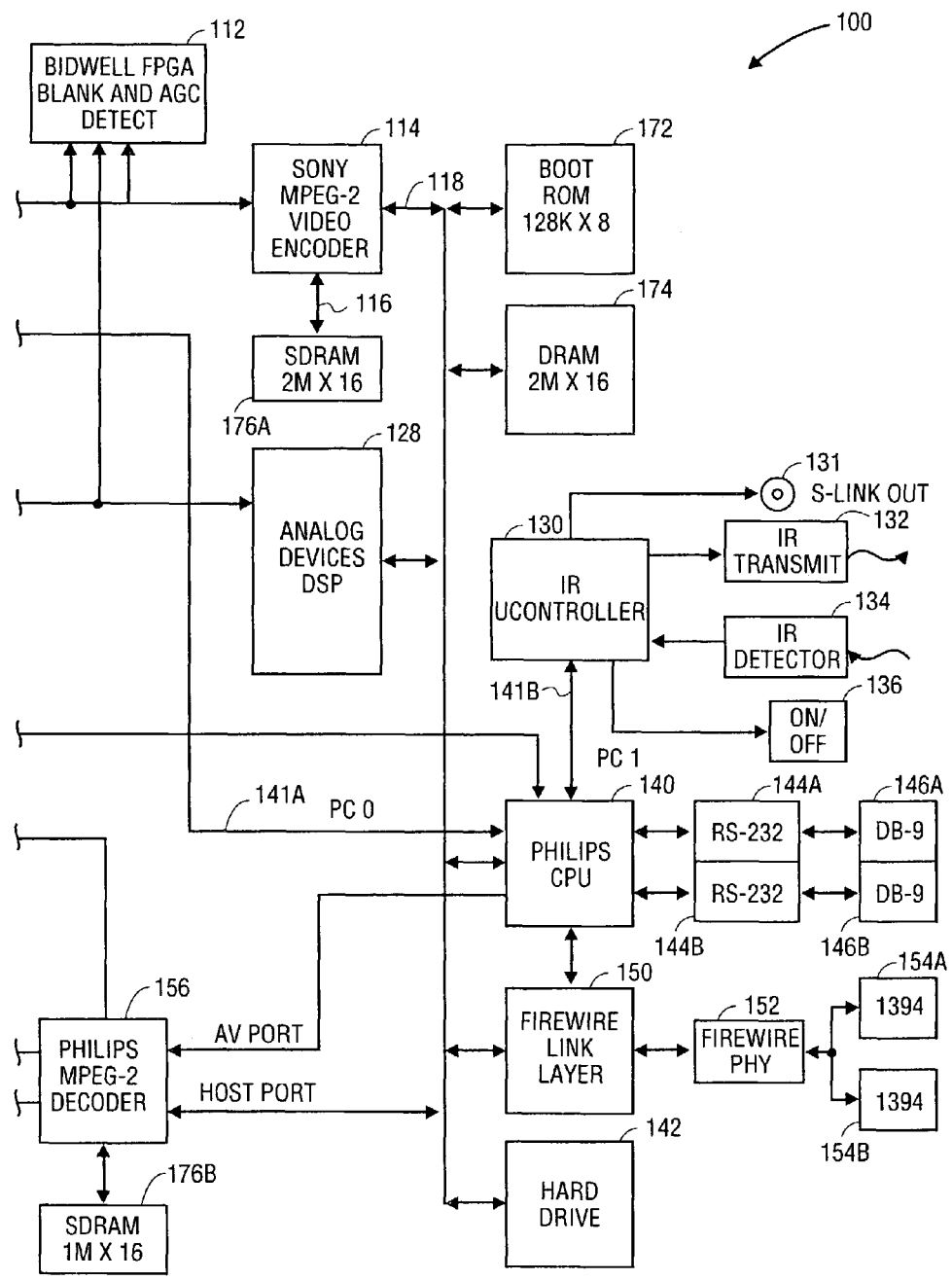

Referring to FIG. 2, the digital VCR 10 includes circuitry 100. Video is input to the digital VCR 10 from one of a number of sources. Cable-ready input is received in analog form from cable TV cable 12 or from antenna 14 at one or more RF-in inputs 102. The RF-in input 102 is coupled to a tuner 108 (Philips FI1236). If the RF-in input 102 is connected to the output of a standard cable TV set-top box, which outputs a single channel on channel 3, for example, the tuner 108 is tuned to channel 3. Otherwise, the tuner 108 can be adjusted to select a channel from among the channels present in the input received at the RF-in input 102. Composite video inputs 104a-b receive composite video input from, e.g., a camcorder. An S-video input 106 receives S-video input from, e.g., the DBS dish 26.

The signals received at the video inputs 102, 104a-b, and 106 are input to a Micronas National Television Standards Committee (NTSC) decoder 109 (VPX3225). The decoder 109 selects which one of the signals received at its inputs will be delivered at its output 110. The decoder 109 digitizes the selected input and outputs the digitized signal at its output 110 in CCIR (Comité Consultatif International des Radiocommunications) 601 format, with a typical resolution of 720×480 pixels. The decoder 109 may be used to reduce the resolution of the input signal by outputting a digitized signal with a smaller number of pixels. The decoder 109 also includes a First In First Out (FIFO) buffer for buffering video.

The digitized video signal output at the output 110 of the decoder 109 is input to a Field Programmable Gate Array (FPGA) Blank and Automatic Gain Control (AGC) Detector 112 and to a Sony Moving Pictures Experts Group 2 (MPEG-2) realtime video encoder 114 (CXD1922Q). The MPEG-2 encoder 114 compresses the digitized video from output 110, and outputs the compressed digitized video on its outputs 116, 118. The MPEG-2 encoder 114 is capable of performing automatic scene detection, i.e., when the video on output 110 changes from one scene to another, the MPEG-2 decoder 114 resets itself and restarts compression at the beginning of the new scene. The MPEG-2 decoder 114 also adjusts the number of bits of video that it compresses per second, based on how much the input signal is changing. In other words, as the amount of change in the input signal increases, the number of bits per second in the compressed output increases. This is referred to as variable bit rate compression.

The FPGA 112 is programmed to detect blank frames in the digitized video signal on output 110. Blank frame detection is used to determine when commercials in a television signal begin and end. For example, the occurrence of multiple consecutive blank frames is a possible indication that a commercial is beginning or ending. Furthermore, if the video portion of the digitized video signal 110 contains blank frames, but the corresponding audio portion of the signal 110 is not silent, a commercial is most likely not occurring. Detection of silent blank frames as representing the start (and end) of commercials can be further enhanced by determining if one such set of silent blank frames is followed some number of seconds (e.g., 30 or 60) by another such set of silent blank frames. The FPGA 112 contains a luma (brightness) threshold register whose value is set by a central processing unit (CPU) 140. The FPGA 112 also contains a counter register. As each video frame is read by the FPGA 112, the FPGA 112 stores in the counter register a count of the number of pixels in the video frame whose intensity value is below the value of the luma threshold register. The CPU can read that count, and determine if the value of the counter register is below a predetermined minimum value after a predetermined number of frames, such that a commercial is determined to have begun.

Some video streams are specially encoded using Macrovision's copy protection scheme in a way that allows the video stream to be displayed correctly on a television, but which causes massive signal degradation if the video stream is recorded onto a video tape. Such encoded video streams can come from a pre-recorded video tape, a laser disc, a DVD (Digital Video (or Versatile) Disk), or from a broadcast such as a premium cable channel or a pay-per-view movie. The FPGA 112 is used to detect the presence of Macrovision copy protection in the signal on output 110. If Macrovision copy protection is detected, then the signal is tagged to indicate that it is copy protected. When a data stream is read from storage (e.g., to play back a recorded television show), copy protection is added to the data stream using the NTSC encoder 304 (FIG. 3) if the data stream is tagged.

Audio input is received either through the tuner 108, through line 1 inputs 120a-b, or through line 2 inputs 122a-b. All received audio signals are input to a Micronas Audio Codec (compressor/decompressor) 124 (MSP3430G). The codec 124 selects the output of the tuner 108, the line 1 inputs 120a-b, or the line 2 inputs 122a-b. The codec 124 digitizes the selected audio signal(s). If the output of the tuner 108 is selected, the codec 124 also performs "stereo decoding," i.e., separates the right and left channel of the audio signal.

The resulting digitized audio signal is output on line 126, where it is input to an Analog Devices Digital Signal Processor (DSP) 128 (ADSP2185). The DSP 128 compresses the received digitized audio signal using MPEG-1, layer 2 compression.

An IR (infrared) microcontroller 130 (SX18AC/DP) sends and receives infrared signals to and from devices such as a television remote control or a set-top cable box. The IR microcontroller transmits infrared signals using an IR transmitter 132, and receives infrared signals using an IR detector 134. The IR microcontroller also detects when the user has pressed an On/Off button 136. The On/Off button 136 toggles the digital VCR 10 between "on" mode and "sleep" mode. When in "on" mode, the digital VCR 10 is fully functional. When in "sleep" mode, the digital VCR 10 can perform just a subset of its functions and can consume less power than when in "on" mode. When in "sleep" mode, however, the digital VCR 10 still performs such functions as recording scheduled shows and downloading channel guide information. Furthermore, when the On/Off button 136 is pressed, the IR microcontroller 130 tests the CPU 140 to determine if the system software running on the CPU 140 has crashed. If the system software has crashed, the IR microcontroller 130 resets the CPU. IR microcontroller 130 can also output IR encoded signals via S-link output 131.

The central processing unit (CPU) 140 (one can use a Philips CPU adapted to function with Philips MPEG-2 decoder SAA7201H, described further below, or another suitable CPU) controls various operations of the digital VCR 10. CPU 140 runs application programs, controls streaming of audio and video, selects the states input select switches in FPGA 112 and the codec 124, and performs other functions, as described in more detail below. The digitized audio output by the DSP 128 and the digitized audio output by the MPEG-2 encoder 114 are stored on a hard disk drive 142. The hard disk drive 142 uses a file system that is described in more detail below.

Serial ports 144a-b receive and send serial data according to the RS-232 standard. Although as shown in FIG. 2 the serial ports 144a-b connect to external devices using DB-9 connectors 146a-b, other appropriate connectors can be used. The serial ports 144a-b can be used, for example, to control a DBS receiver. A device such as personal computer 24 can be connected to the digital VCR 10 through the serial ports 144a-b to control the digital VCR 10. The modem 148 connects to the telephone line 20 (FIG. 1) through a Data Access Arrangement (DAA) 149 and a telephone jack. The modem 148 can be used, for example, to download channel guide information. Channel guide information can also be contained within the vertical blanking interval (VBI) of the video input signal, or received through a broadcast pager network. If the digital VCR 10 is connected to a DBS receiver, channel guide information can be obtained from the received DBS signal.

A FireWire link layer 150 (PDI1394L11), FireWire physical layer 152 (PDI1394P11), and FireWire ports 154a-b allow the digital VCR 10 to send and receive digital video according to the IEEE 1394 standard. Additional hard disk drives can be connected to the digital VCR 10 through the ports 154a-b to provide additional storage capacity. The ports 154a-b can also be used to connect the digital VCR 10 to, another digital VCR. If two digital VCRs are connected to each other via ports 154a-b, the two digital VCRs can recognize each other's presence. One digital VCR recognizes itself as the "master" and is connected to the television 18, and the other digital VCR recognizes itself as the "slave." The "slave" ignores all IR commands intended for the "master." The two digital VCRs present a single unified interface to the user, effectively allowing the user to use the two digital VCRs as if they were a single digital VCR with two tuners and the combined disk space of the two individual digital VCRs. When the two digital VCRs are disconnected from each other, they revert to their regular functioning and operate independently. High-definition television (HDTV) signals can also be sent and received through the ports 154a-b.

Audio and video output are transmitted over a high-speed bus to a Philips MPEG-2 decoder 156 (SAA7201H). The decoder 156 receives a combination of audio and video referred to as a "program stream" from the CPU 140. The decoder 156 decompresses the program stream, sends the decompressed audio to an audio digital-to-analog converter (DAC) 158 (TDA1311) and to a Philips NTSC (and PAL) encoder 157 (SAA7120) which then sends the decompressed and now re-encoded video on a Y line 160a and a C line 160b to a video filter 162 (ML6428), which filters the decompressed re-encoded video to improve its quality. The decoder 156 also sends digitized decompressed audio in Sony Philips Digital Interface (SPDIF) format (represented by block 159) to a SPDIF output port 161.

Analog audio signals are output by the audio DAC 158 to line 1 out ports 164a-b and line 2 out ports 166a-b. Filtered video signals are output to composite video outputs 168a-b and to S-Video output 170. A Boot read-only memory (ROM) 172 contains startup object code that begins executing when the digital VCR 10 is turned on. The code in the Boot ROM causes the digital VCR 10 to load system software object code from the hard disk drive 142 into a DRAM 174 and to execute that code, causing the digital VCR 10 to begin normal operation. The DRAM 174 also stores temporary data used by the system software. SDRAMs 176a and 176b are used by the MPEG encoder 114 and the MPEG decoder 156 to store data as it is being compressed and decompressed, respectively.

Figure 3:
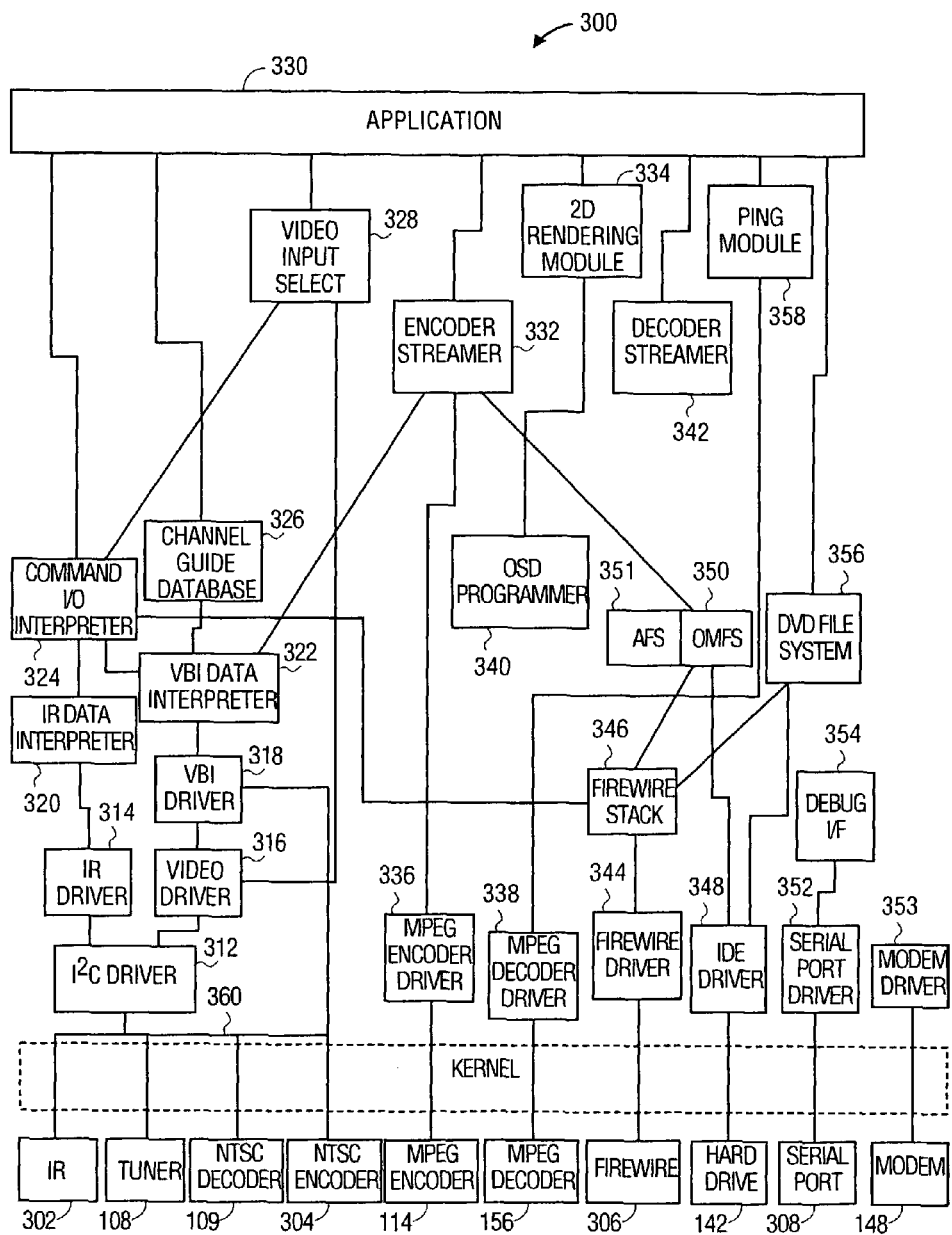
FIG. 3 is a block diagram of digital VCR system software.

Referring to FIG. 3, the digital VCR 10 is controlled by system software 300. Kernel 310 is an operating system or a part of an operating system that can reside in the Boot ROM 172 and which is used to control basic functions of the digital VCR 10 system software 300. Kernel 310 is based upon the MQX kernel produced by Precise Technology. Kernel 310 supports such features as preemptive multitasking, message passing, interrupt handling, list management, and dynamic link library (DLL) handling.

In general, the device drivers (i.e., the I$^2$C driver 312, the IR driver 314, the serial port driver 352, the modem driver 353, the FireWire driver 344, the IDE driver 348, the MPEG encoder driver 336, and the MPEG decoder driver 338) are responsible for communicating with and directly controlling the hardware components of the digital VCR 10. The device drivers isolate the components of the system software 300 from the particular hardware devices used to implement the digital VCR 10 so that the system software 300 need not be modified if different hardware components are used.

The I$^2$C bus 360 is a 2-wire bus (comprising wires 141a and 141b) that connects the IR subsystem 302, the tuner 108, the NTSC decoder 109, and the NTSC encoder 304 together. The I$^2$C driver 312 provides arbitration to the bus 360 for communicating with these devices.

The IR driver 314 is responsible for reading data from the IR detector 134, and for sending infrared signals to other components using the IR transmitter 132. For example, the IR driver 314 convert bitstreams received through the I$^2$C driver 312 into information describing which keys (if any) have been pressed on the remote control 22.

The IR data interpreter 320 receives a raw bitstream of IR data from the IR driver 314 and converts the bitstream into meaningful keypress values. It also receives outgoing device control information (i.e., information about commands to control external devices) and converts the device control information into a bitstream that is output to the IR transmitter 132 through the IR driver 314.

IR subsystem 302 includes the IR transmitter 132 and IR detector 134 (FIG. 2). The IR subsystem 302 receives information from and transmits information to I$^2$C driver 312 which handles I$^2$C buses 0 and 1 (141a and 141b). IR driver 314 receives bitstreams representing keypresses on the remote control 22 from the I$^2$C driver 312.

An IR data interpreter 320 uses bitstreams from the IR driver 314 to determine which keys (if any) on the remote control 22 have been pressed, and converts commands for controlling external hardware into IR bitstreams.

An NTSC encoder 304 encodes outgoing video signals in NTSC format. In FIG. 2, the NTSC encoding function is performed by the combination of the MPEG-2 decoder 156 and the video filter 162. A VideoSrc DLL 316 uses the I$^2$C driver 312 to control the NTSC decoder 109 and the NTSC encoder 304, and to tune the tuner 108 to desired channels.

A VBI driver 318 receives information encoded within the VBI received from video driver 316, and VBI data interpreter 322 decodes and interprets that data as necessary.

A video input select module 328 selects what video source (e.g., broadcast, cable, conventional VCR, etc.) is currently being used by digital VCR application 330. Video input select 328 coordinates this selection with command I/O interpreter 324, and video driver 316.

The command I/O interpreter 324 receives keypress information from the remote control 22, and sends key commands to be output to the IR transmitter 132. The command input/output interpreter 324 receives user commands such as keypresses from the application 330.

The serial port driver 352 interacts with the serial port subsystem 308. A serial port subsystem 308 includes RS-232 serial ports 144a-b and DB-9 connectors 146a-b. A debug I/F module 354 sends and receives raw bitstreams to and from a serial port driver 352, which interfaces with the serial port subsystem 308. If the serial port subsystem 308 includes multiple serial ports, as shown in FIG. 2, the serial port driver 352 interacts with each of the serial ports individually. The serial port subsystem 308 can be used, for example, to control a Digital Satellite System (DSS), or to communicate with the personal computer 24, external input devices such as a keyboard, or a second digital VCR in a master/host relationship.

A modem driver 353 is responsible for setting up connections with the modem 148, sending and receiving data to and from the serial port driver 352, handling data error detection, correction, or retransmission, and transfer protocols. If the modem 148 is configured to receive incoming calls, then the modem driver 353 decides if the incoming call is directed to the digital VCR 10.

Digital VCR application 330 forwards commands received from the user such as keypresses to a command input/output interpreter 324. The digital VCR application 330 obtains channel guide information received using the modem 148. The digital VCR application 330 uses a 2D graphics DLL (Dynamic Link Library) 334 to draw text and graphics on the television screen. The 2D graphics DLL 334 passes rectangular regions of memory containing rendered images to an MPEG decoder driver 338 to display the rendered rectangular regions.

A beep DLL 358 configures the beep section of the MPEG decoder driver 338. The beep DLL 358 is used to make audible "ping" sounds in response to user actions. The digital VCR application 330 sends commands related to recording named content streams to an MPEG encoder streamer 332, which in turn communicates with an optimized MPEG file system (OMFS) 350 (explained in greater detail below). The digital VCR application 330 sends VCR-style commands such as play, stop, and rewind to an MPEG decoder streamer 342.

Firewire subsystem 306 includes FireWire Link Layer 150, FireWire Physical layer 152, and FireWire ports 154*a-b*. A FireWire Driver 344 passes a raw bitstream, received from the FireWire subsystem 306, to a FireWire stack 346. Furthermore, the FireWire subsystem 306 can be used to connect multiple digital VCRs together. FireWire Stack 346 can communicate with a DVD file system 356 for retrieving and managing information received from a DVD player, and which can store DVD files on hard drive 142 through IDE driver 348.

The FireWire (IEEE 1394) subsystem 306 includes a high speed serial bus designed to transmit digital audio and video data. The FireWire subsystem 306 can transmit between 100 and 400 million bits-per-second (Mbps), depending on the particular configuration. The FireWire subsystem 306 can be used, for example, to transfer data to and from a PC or a DVD, or to connect the digital VCR 10 to a second digital VCR in a master/slave relationship. Such a combination of two digital VCRs can effectively provide the user with two tuners, a single file system, and two or more hard disk drives or DVDs.

The IDE driver 348 controls the hard disk drive 142. For example, the IDE driver 348 is responsible for generating commands to control the hard disk drive 142, such as reading or writing disk sectors, formatting the disk, performing diagnostics, or returning status information.

The digital VCR application 330 reads and writes from files on the hard disk drive 142 using the OMFS 350. The digital VCR application 330 optionally performs DVD-related functions (e.g., reading information from a DVD) using the file system 350. The OMFS 350 instructs the IDE driver 348 to read and write blocks of data to and from the IDE hard disk drive 142. The OMFS 350 instructs the IDE driver 348 to read blocks of data from a DVD. Other peripheral standards can be employed for disk drive access, such as SCSI instead of IDE.

An asynchronous file system (AFS) 351 operates in conjunction with the OMFS 350 to allow asynchronous access to files stored on the hard disk drive 142. For example, immediately after the streamers 332, 342 make a request to the asynchronous file system 351 to perform a file function (e.g., read or write), control returns to the streamers, allowing them to continue streaming. When the requested file function is complete, the asynchronous file system 351 notifies the requesting streamer. This allows the streamers 332, 342 to perform other functions while the asynchronous file system 351 is performing file-related operations.

An MPEG encoder streamer 332 writes MPEG-encoded data to the OMFS 350. An MPEG decoder streamer 342 reads MPEG-encoded data from the OMFS 350, and reads MPEG-encoded DVD data from the file system 350. The encoder streamer 332 and decoder streamer 342 are described in more detail below.

The MPEG decoder driver 338 controls the MPEG decoder 156, which produces an NTSC or PAL video signal from digital video data. The MPEG decoder driver 338 also controls the audio DAC 158 to produce outgoing audio.

The MPEG encoder driver 336 controls the MPEG encoder 114, which encodes the digital video data from the Micronas NTSC decoder 110 into an MPEG-2 video stream. The encoder 114 can support the MacroVision copy protection scheme, as described above.

The digital VCR 10 uses the OMFS 350 to read and write files from the hard disk drive 142. Such files include MPEG audio and video streams, preference files, and files containing channel guide information. The OMFS 350 minimizes disk fragmentation by efficiently streaming MPEG data to and from the hard disk drive 142.

The hard disk drive 142 includes a number of disks, also referred to as platters, that spin together. Each platter has one read/write head for each surface that is being used. Each surface has a number of concentric tracks that are grouped together in a number of zones, and each zone is divided into a number of sectors per track. Each sector stores a fixed number of bytes of information (e.g., 512 bytes). For example, the 4.3 Gb Quantum Fireball ST drive has 6 surfaces, 15 zones, and 7066 tracks per surface. The inside zone has 143 sectors per track, and the outside zone has 239 sectors per track.

The files stored on the hard disk drive 142 include MPEG program streams, database files, preferences files, and program code files. The MPEG program streams can contain recorded broadcast data, stored as MPEG-2 Program System Streams, with video and audio Packetised Elementary Streams (PES) multiplexed together. Preferences files can contain data describing the way in which the user has configured the system, such as the preferred encoding bit rate, favorite channels, and personal channels. Program code files contain binary code for applications, system modules, DLLs, etc. The OMFS 350 supports filenames that are long enough to provide differentiation between files, e.g., 16 characters.

The OMFS 350 can use "circular" files to store one or more rewind buffers. Such files are allocated a fixed amount of contiguous disk space upon their creation. Information is written to such a file contiguously starting from the beginning of the allocated block of disk space. When the end of the block is reached, writing resumes at the beginning of the block. Alternatively, the OMFS 350 can store the rewind buffer in a non-circular file that is allocated a fixed amount of contiguous space (e.g., enough space to hold 15 minutes of video), but which allows that contiguous space to vary across the disk. Data is written to the file until the allocated amount of space is used up, at which point data continues to be written to further areas dynamically assigned to the file, while data is deleted from the beginning of the file (and that area is dynamically de-assigned). With either method, as an example, after 20 minutes of recording a show into the rewind buffer, the rewind buffer would contain a file which contains 15 minutes of contiguous data corresponding to minutes 5 through 20 of the show.

The file system 350 pre-allocates space on the hard disk drive 142 for files when the files are created. Contiguous blocks of space are allocated if at all possible. For example, if the digital VCR 10 is about to record a 30-minute television show, the file system 350 creates a new file and allocates sufficient space on the hard disk drive 142 to store 30 minutes of video. This allows data to be streamed to the hard disk drive 142 contiguously and without the need to allocate additional space for the file as the show is being recorded.

Some files, such as MPEG audio and video files, can be deleted, while other files, such as preferences files and program code files, cannot be deleted. Each file stored on the hard disk drive 142 has an attribute field associated with it which indicates whether the file can be deleted and whether the file is read-only.

If errors occur in MPEG files on the hard disk drive 142, the MPEG decoder 342 either hides or recovers from the errors. In order to hide the effects of disk errors, duplicate copies of important files (such as program code files) are stored on the hard disk drive 142. If the OMFS 350 notices that a file has become corrupt, the system software 300 can use the duplicate copy of the file. Furthermore, the OMFS 350 can recognize bad sectors on the hard disk drive 142 and marks those sectors so that they are not used in the future.

The amount of movement of the hard disk drive's read/write head is reduced in order to reduce seek time from the hard disk drive 142. One way to reduce read/write head movement is to use file caches. Data that is being written by the MPEG encoder 114 is stored in a cache before being written to the hard disk drive. If this data is needed by the MPEG decoder 156 shortly after it has been written to the cache, the data can be read from the cache instead of from the hard disk drive 142.

Other aspects of the OMFS 350 are as follows. Each MPEG PES packet contains the same number of bytes as a sector on the hard disk drive 142 (e.g., 512 bytes). This allows the MPEG streamers 332 and 342 to read and write whole sectors at a time. The sectors on a single track of the hard disk drive 142 can only be used to store data from a single file. This can simplify allocation of sectors to files, because it allows the OMFS 350 to allocate multiple sectors at a time to a file. As data is written to the OMFS 350 by the MPEG Encoder subsystem 114, each PES packet is marked with its position in the MPEG file before the data is sent to the IDE driver 348. This allows the OMFS 350 to determine whether a packet being requested can be retrieved from a cache rather than from the hard disk drive 142.

The OMFS 350 uses n caches, where each cache has enough space to store an entire disk sector (PES packet). The value n is calculated such that when the digital VCR 10 is simultaneously recording and playing back the same file, the sector requested by the MPEG decoder subsystem 156 is cached and is ready to be written to the hard disk drive 142, but is not yet written.

As the hard disk drive 142 becomes full, it may not be possible to store files on contiguous disk tracks because the file may not fit in any of the available contiguous blocks. This is referred to as fragmentation. The OMFS 350 uses a defragmentation application to defragment the hard disk drive 142 periodically (e.g., each night at a time when the digital VCR 10 is typically not in use, or when a file is deleted). The defragmentation application can be part of the OMFS 350 or be a separate application that communicates with the OMFS 350.

If two or more digital VCRs are connected to each other (using, e.g., the FireWire subsystem 506), one digital VCR is considered the "master" unit and the other unit is considered the "slave" unit. Consider the situation where the slave unit is recording a live show while the master unit is being used to watch (and also record) a live television show on another channel. If the hard disk drive of the master unit is full, but there is space available on the slave's hard disk drive, then the master unit stores the video stream from its current channel onto the slave's hard disk drive.

The digital VCR 10 can receive user commands from a number of different sources. Possible sources of user input include the IR detector 134 (for receiving remote control keypresses), the modem 148 (for, e.g., receiving commands to record a television show), a pager (for, e.g., receiving commands to record a television show), a universal serial bus (for receiving input from a keyboard or mouse), or a microphone (for receiving voice commands). All user commands are routed through the command input/output interpreter 324. In this way, the digital VCR application 330 receives a single command input stream regardless of the input devices from which the inputs originate. Similarly, the all commands output by the digital VCR 10 to external devices, such as a cable TV set-top box or the personal computer 24, are output through the command input/output interpreter 324, which forwards the command to the appropriate external devices in a suitable format.

The 2D graphics DLL 334 produces graphics overlays to display on-screen user interface elements such as the channel guide display 500. The MPEG decoder 109 is capable of overlaying a 2D image on top of the underlying MPEG video, using 2, 4, or 8 bits per pixel.

The digital VCR 10 includes a realtime clock that keeps the current time of day and the current date. The realtime clock is used to display the current time to the user and to determine when a scheduled show is to be recorded. The realtime clock can be set by the user or be set automatically by reading data from line 21 of the VBI signal (via VBI data interpreter 322 and VBI driver 318) or by downloading time information from a server using, e.g., the modem 148.

The "MPEG subsystem" refers to the MPEG encoder streamer 332, the MPEG decoder streamer 342, the MPEG decoder driver 338, and the MPEG audio/video decoder device drivers 336*a-b*. Each of these components of the MPEG subsystem runs as a separate thread. This allows the MPEG subsystem to take advantage of features such thread prioritization. For example, the threads allow multiple data streaming activities (such as recording and playback) to be interwoven and to appear to the user to be occurring simultaneously.

The MPEG encoder 114 and MPEG decoder 156 encode and compress audio and video data, multiplex the compressed data together, save the multiplexed data stream to the hard drive 142, and simultaneously load another multiplexed data stream from the hard disk drive 142, demultiplex it, and decompress and display the audio and video data contained in it.

The streamers 332 and 342 provide an abstract interface to the encoder 114 and decoder 156, respectively. As a result, if the encoder 114 and/or decoder 156 are replaced with other devices, only the drivers 336 and 338 need be modified or replaced while the rest of the system software 300 remains intact.

The MPEG encoder subsystem includes the encoder streamer 332, the video encoder device driver, and the audio encoder device driver, each of which run as separate threads. The MPEG encoder subsystem controls the MPEG encoder 114 to encode the incoming broadcast signal, encapsulate the video and audio data into an MPEG-2 program stream, and save the program stream to the hard disk drive 142, without losing any data. The two device drivers are responsible for initializing the hardware, enabling direct memory access (DMA) transfers from the hardware into RAM buffers, handling errors, and handling interrupts. The encoder streamer 332 is responsible for ensuring that the device drivers have sufficient buffer space into which the hardware can write the encoded data, packetising the elementary streams from the encoders, multiplexing the audio and video PES data together, capturing data from the VBI, and writing data to the OMFS 350. The components of the MPEG encoder subsystem respond to external commands to stop and start recording, change the recording bit rate, change the encoding resolution, save the current stream position as a bookmark, and respond to other user actions.

The MPEG encoder driver 336 (1) performs hardware initialization, such as setting up the encoder 114 to handle the input data resolution and timing, and setting encoding parameters such as bit rate, (2) performs interrupt handling, (3) controls DMA transfers, used to transfer encoded data from the encoder 114 into RAM buffers, and (4) inserts data into the user-data part of the PES header. The MPEG encoder streamer 332 ensures that the two device drivers 336 and 338 have sufficient buffer space so that the encoder stream does not stall. The MPEG encoder streamer 332 also acts as an interface to the digital VCR application 330 to control encoding parameters and actions.

The "MPEG decoder subsystem" refers to the decoder streamer 342 and the MPEG decoder driver 338, each of which runs as a separate thread. The decoder subsystem controls the MPEG decoder 156 to decode encoded MPEG data and to display the resulting video frames synchronized to the decoded audio, without dropping any video frames. The rate of decompression and display is managed by the decoder 156, which decodes both audio and video MPEG data, and synchronize the video to the audio. Therefore, the decoder 156 synchronizes the video and audio using Presentation Time Stamp (PTS) values present in the video and audio streams. As data buffers are emptied by the decoder 156, they are passed back up to the decoder streamer 342 in order to be refilled from the data stored on the hard disk drive 142.

The decoder driver 338 is responsible for initializing the hardware, enabling DMA transfers to the hardware from RAM buffers, handling errors, and handling interrupts. The decoder streamer 342 is responsible for ensuring that the device driver 338 is provided with data when necessary, which involves reading the data from the hard disk drive 142, parsing PES packets to determine if the data is audio or video, extracting extra information (such as Closed Captioning) from the video packets, and sending the data to the decoder driver 338.

The components of the MPEG decoder subsystem respond to external commands to control the decoder 156, such as VCR-style commands to stop, start, pause, forward, reverse, and jump to random positions in the video stream. When paused, the decoder streamer 342 instructs the MPEG decoder driver 338 to stop decoding. As a result, the MPEG decoder driver 338 instructs the MPEG decoder 156 to stop decoding. When the MPEG decoder 156 stops decoding, the data that has been read from the hard disk drive 142 will be queued by the MPEG decoder driver 338 to the MPEG decoder 156, and the empty buffers that have been queued to the OMFS will be filled. When fast forwarding, the MPEG decoder streamer 342 instructs the MPEG decoder 156 to decode and display every n frames, where n is greater than 1.

MPEG video contains "I" frames, "B" frames, and "P" frames. An I frame contains data descriptive of a complete frame of video. An I frame is followed by a number of B frames and P frames. Information in the B frames and P frames is used to modify the preceding I frame to generate subsequent frames. To rewind, the MPEG decoder 156 is instructed to stop decoding, all of the data queued to the decoder 156 is flushed, and the decoder 156 is put into I-frame only mode (in which it decodes only I frames, skipping all B and P frames). The decoder streamer 342 and MPEG decoder driver 338 flush all of their buffers. The decoder streamer 342 then starts seeking backwards in the video stream until it identifies the beginning of the previous I frame. When the previous I frame is found, the decoder streamer 342 streams forward again, as in play mode, to show at least one complete I frame to the viewer, until it finds the next non-I frame, at which point it starts searching backwards again, past the last found I frame, to the next prior I frame. This procedure synthesizes an I frame by I frame rewind with MPEG data.

Before describing the user operation of the digital VCR, several terms need to be introduced. The "current time" is the time on the digital VCR's internal clock, reflecting the actual time. The "current channel" refers to the channel to which the digital VCR 10 is currently tuned. The current channel can be a live television channel or a recorded channel, as described below. If the current channel is a live television channel, the "current show" is the television show being played on the current channel at the current time.

Figure 4:
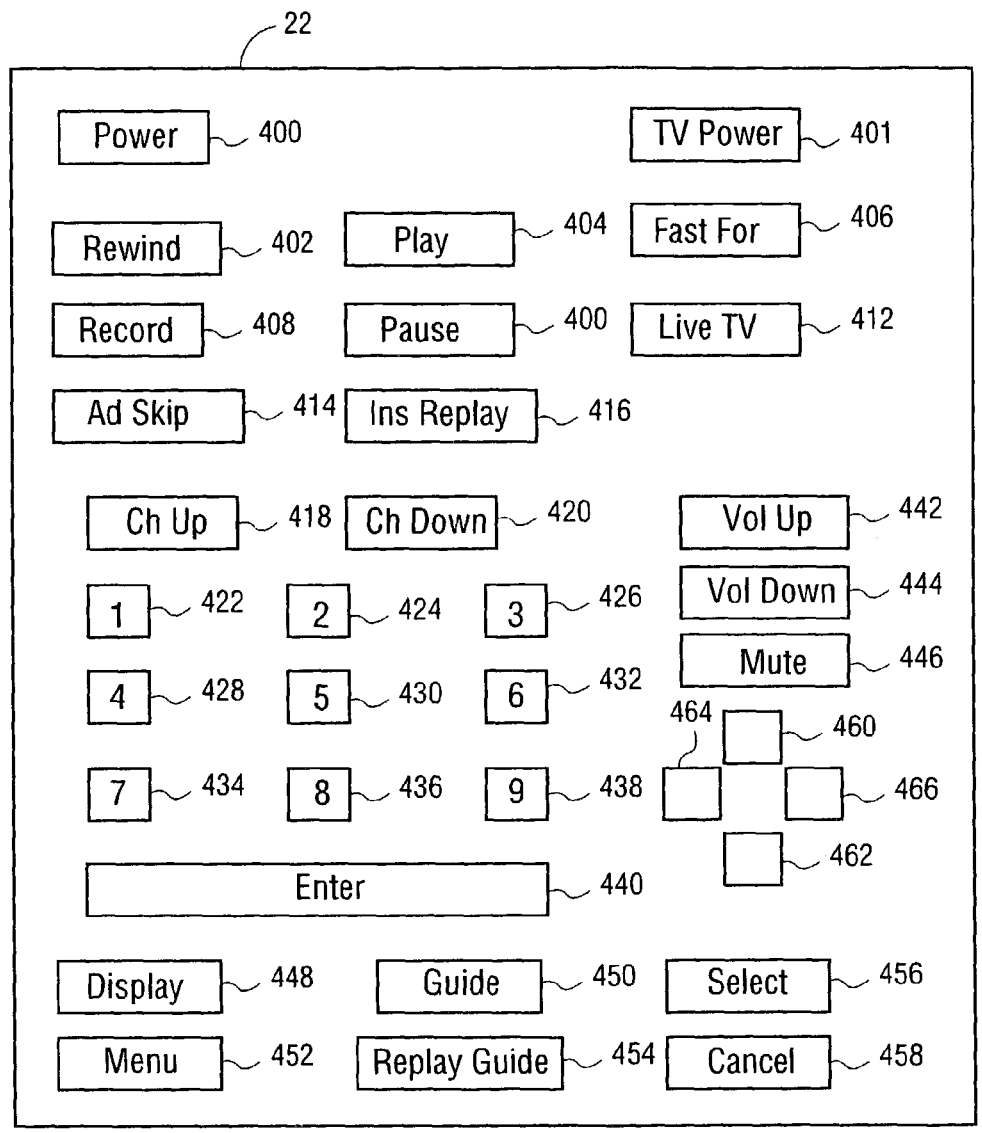
FIG. 4 is a block diagram of a digital VCR remote control.

Referring to FIG. 4, the remote control 22 includes, for example, the following buttons. A Power button 400 toggles the digital VCR 10 between "on" mode and "sleep" mode, as described with respect to the On/Off button 136 described above.

A TV Power button 401 turns the television 18 on and off. A Rewind button 402, Play button 404, Fast Forward button 406, Record button 408, Pause button 410, and Live TV (Stop) button 412, perform VCR-like functions on live television channels and recorded television shows, as described in more detail below. An Ad Skip button 414 skips to the end of a commercial when a recorded video stream is being played. An Instant Replay button 416 rewinds the currently playing video stream by a predetermined amount and then resumes playing. A Channel Up button 418 and a Channel Down button 420 change digital VCR channels, as described below. The user can also tune to a channel by entering the channel number using numeric keys 422-238 and pressing an Enter button 440. A Volume Up button 442 and a Volume Down button 444 can increase and decrease the volume of the digital VCR's audio output, or can increase and decrease the audio volume of the television 18 directly. A Mute button 446 temporarily suspends audio output from the digital VCR 10. Cursor keys 460-466 are used to navigate through on-screen menus, as described below. A Menu button 452 displays a main menu from which sub-menus can be selected. A Guide button 450 causes a channel guide display to be displayed on screen, and a Display button 448 causes an on-screen display to be displayed on-screen, as described below. A Select button 256 is used to select choices in on-screen menus, as described below. A Replay Guide button 454 causes a replay menu to be displayed on-screen. Alternatively, the replay menu can be displayed by pressing the Play button 404 while a show is playing. A Cancel button 458 is used to remove menus from the screen and to cancel choices made by the user.

Channels on a television correspond to channels that are broadcast by television networks. A "digital VCR channel," in contrast, can correspond to any video stream. A digital VCR channel can correspond to, for example, a traditional television channel (i.e., a broadcast VHF/UHF channel), a pay-per-view broadcast, a video stream from a recorded video source such as a VCR, or a video stream recorded by the digital VCR 10 on the hard disk drive 142. The digital VCR 10 maintains a single channel list. Each channel in the channel list has a unique channel number and corresponds either to a live television channel or to recorded content. Channel numbers can, for example, be four-digit numbers, the first digit of which indicates the source of the channel. For example, channels 1000 through 1999 can correspond to cable television channels, channels 2000 through 2999 can correspond to DBS channels. Channels corresponding to content that has been recorded using the digital VCR 10 on the hard disk drive 142, referred to as "Personal Channels," can correspond to channel numbers 3000 through 3999. This arrangement provides the user with a single list of channels regardless of the number of video sources to which the digital VCR 10 is connected. Alternatively, one channel list can correspond to channels received from live television sources, and a second channel list can correspond to personal channels.

A channel guide database 326 stores information about channels and the video streams associated with them. For example, the channel guide database contains information about upcoming television shows that are scheduled to be broadcast on live television channels.

Channel guide information for channels from live video sources, such as cable TV channels and DBS channels, can be downloaded periodically from the cable TV or DBS provider, or from an online service using the modem 148. Some television stations broadcast program information in the VBI signal using, for example, extended data service (XDS). For such stations, channel guide information need not be separately downloaded, since the channel guide information can be derived from the VBI. The channel guide database can be stored on the hard disk drive 142, in dynamic RAM (DRAM) 174, or on other suitable computer-readable media.

For each live television channel, the channel guide database includes program listings describing the shows that will be playing on the channel. The channel guide database can contain information about each show, such as the title of the show, the show's start time and end time, descriptions of topics to which the show relates, and other information such as the names of actors who appear in the show.

Figure 5:
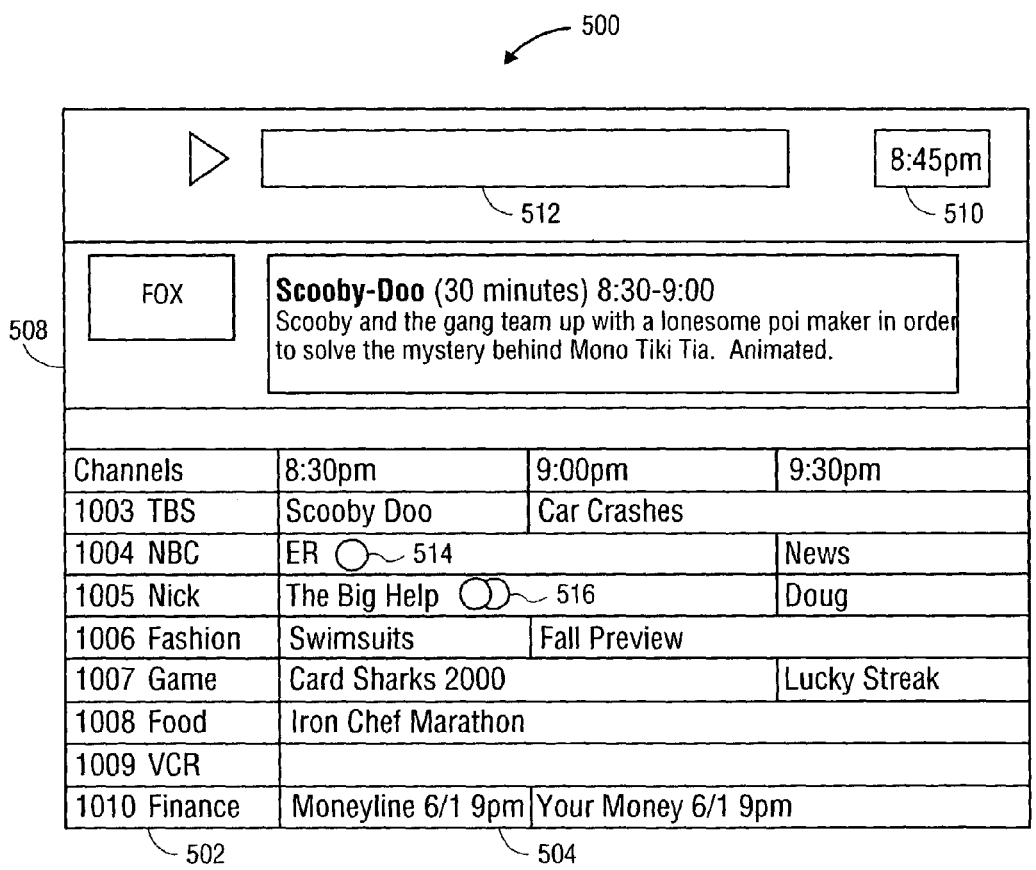
FIG. 5 is a block diagram of a channel guide display.

Referring to FIG. 5, a channel guide display 500 presents the user with a visual representation of information contained in the channel guide database and of content recorded in personal channels. The information about content recorded about personal channels that is displayed by the channel guide display 500 is derived from the show information that is recorded in the personal channels. The user causes the channel guide display 500 to appear on the screen by pressing the Guide button 450 on the remote control 22. The channel guide display 500 can be transparently or opaquely displayed over the video of the current channel, while the audio of the current channel is still playing. A channel list display 502 displays the channel numbers and names of a subset of the channels in the channel list, including live television channels, channels corresponding to recorded video sources, and personal channels. A show display 504 presents a list of television shows that are scheduled to air on live television channels and shows that have been recorded on recorded channels. For example, the channel guide display 500 indicates that channel number 1003 corresponds to the Turner Broadcasting System (TBS), which is a live television channel. An episode of "Scooby Doo" is playing on TBS from 8:30 pm until 9:00 pm, and an episode of "Car Crashes" is playing on TBS from 9:00 pm until 9:30 pm. Channel number 1009 corresponds to content recorded on the VCR 15. To play back a tape in the VCR 15, the user selects channel 1009 and presses the Play button 404 on the remote control 22. The digital VCR 10 selects the VCR 15 as the current video source and forwards the play command to the VCR 15. The play command can be forwarded to the VCR 15 using, for example, the IR transmit 132 or FireWire ports 154a-b to send a signal to the VCR 15. Channel 1010 corresponds to a personal channel named "Finance," which will be described in more detail below.

When the channel guide display 500 appears on the screen, the channel list display can be centered around the current channel, or the current channel can be at the top of the channel guide display 500. The user can scroll through the channel guide display 500 using cursor keys on the remote control 22 in order to view channel guide information for other channels or to view show information for other times. The user can use the cursor buttons 460-466 on the remote control 22 to highlight shows. Highlighting a show can cause additional information about the show to be displayed in an on-screen display 508. For example, as shown in FIG. 5, an episode of "Scooby Doo" has been highlighted. As a result, the on-screen display 508 displays information about the highlighted episode, such as its title, duration, start and end times, a brief description, and the network on which it is being broadcast. If the digital VCR 10 is displaying part of a television show while the television show is being recorded, the on-screen display 508 also contains information about the relation of the content being displayed to the current time. For example, the on-screen display 508 can indicate that the content being displayed is five minutes behind the current time or in sync with the current time.

The channel guide display 500 also contains additional information such as the current time 510 and a filter bar 512 which displays filtering information. Filtering information can include, for example, a television show title, an actor's name, or a keyword. If, for example, the user specifies as filtering information that the user is only interested in watching recorded shows with the word "sports" in their titles, the filter bar 512 displays the word "sports" and the digital VCR 10 replays only recorded content with a title containing the word "sports." If the user has not specified any filtering information, the filter bar can, for example, be empty or display the word "Channels," and the digital VCR 10 displays all content on the current channel. Other information, such as the video source from which channels originate, can also be displayed by the channel guide display 500.

Although the channel guide display 500 initially shows channels in the channel list display 502 in sequential order, and displays shows in the show list display 504 in chronological order, channels and shows can be arranged in other ways. For example, shows can be sorted by category, or the user's favorite channels can be grouped together. Shows sharing category information can be displayed using the same color. The channel number that is associated with a channel can be changed using the channel guide display 500 by highlighting the current channel number in the channel list display 502 using the cursor buttons 460-466, pressing an appropriate button on the remote control 22, and following on-screen prompts for changing the channel number. The user can also create a list of "favorite channels" which can be grouped together in the channel guide display 500 and can be navigated sequentially using the remote control's Channel Up button 418 and Channel Down button 420.

While the channel guide display 500 is on the screen, the user can (1) highlight a show in the show display list 504 using the cursor buttons 460-466 and press the Select button 256 on the remote control 22, causing the tuner 108 to tune to the selected show and the selected show to be displayed on the screen; (2) highlight an upcoming show and display its show information in the on-screen display 508; (3) select a channel from the channel list display 502, causing the tuner 108 to tune to the channel and display the channel's channel information; (4) highlight a show in the show list display 504 using the cursor buttons 460-466 and press the Record button 408 on the remote control 22 to mark the selected show to be recorded; or (5) press the Cancel button 258 on the remote control 22 to remove the channel guide display 500 from the screen.

When the channel guide display 500 is on the screen, the user can use buttons on the remote control 22 as follows. The Channel Up button 418 and Channel Down button 420 page up and down through the channel list, respectively. If a show in the show list display 504 is highlighted, pressing the Cursor Up button 460 and Cursor Down button 462 moves the hotspot to the show directly above or directly below the hotspot's current position, respectively. If a channel in the channel list display 502 is highlighted, pressing the Cursor Up button 460 and Cursor Down button 462 highlights the channel directly above or below the currently highlighted channel, respectively. If a show in the show list display 504 is highlighted, pressing the Cursor Left button 464 and Cursor Right button 466 moves the hotspot 506 to the show directly to the left or to the right of the hotspot's current position, respectively. While the channel guide display 500 is on the screen, the user can highlight a channel in the channel list display 502 directly by pressing the numerical keys 422-238 on the remote control (direct tuning).

While the channel guide display 500 is on the screen, pressing the Select button 256 on the remote control 22 performs different functions depending on which element of the channel guide display 500 is current highlighted. If a show that is currently being broadcasted is highlighted, pressing the Select button 256 tunes to the show and removes the channel guide display 500 from the screen. If a show that is not currently being received from a live video source is highlighted, a list of options is displayed (e.g., tune to the highlighted show's channel, record one episode of the highlighted show, record all episodes of the highlighted show). If a channel in the channel list display 502 is highlighted, pressing the Select button 256 brings up the channel options display.

While the channel guide display 500 is on the screen, the user can record one or more episodes of a show by highlighting an episode of the show using the cursor buttons 460-466 and pressing the Record button 408 on the remote control 22. Pressing the Record button 408 schedules a single episode of the show and causes a single circle to appear next to the name of the show in the show list display 504. As shown in FIG. 5, for example, the user has selected to record a single episode of "ER", which is indicated by a single circle 514. Pressing the Record button 408 a second time schedules all upcoming episodes of the show to be recorded and causes a double circle to appear next to the name of the show in the show list display 504. For example, referring to FIG. 5, the user has selected to record all upcoming episodes of "The Big Help", which is indicated by a double circle 516. Pressing the Record button 408 a third time cancels scheduled recording of the show and removes the double circle from the show's name in the show list display. If the show that the user selects to record conflicts in time with another show that is scheduled to be recorded, the digital VCR 10 notifies the user of the conflict using an on-screen display. The user can then (1) view the channel guide listing for the conflicting show; (2) record the currently-selected show instead of the conflicting show; or (3) cancel recording of the selected show.

A user can create a personal channel on which to record content received from the attached video sources satisfying specified record criteria. For example, a user might create a "Finance" personal channel whose record criteria specify all episodes of the shows "Moneyline" and "Your Money." The digital VCR 10 records all subsequent episodes of "Moneyline" and "Your Money" received from video sources attached to the digital VCR 10 by comparing the record criteria to information contained in the channel guide database 326. Whenever an episode of "Moneyline" or "Your Money" airs (i.e., is received from any of the video sources connected to the digital VCR 10), the digital VCR records the episode by storing the episode's video and audio streams on the hard disk drive 142 along with additional information about the episode, such as the time at which it aired and other information obtained from the channel guide database 326.

Optionally, the digital VCR 10 can begin recording a show at a selected time (e.g., three minutes) before the show is scheduled to be broadcast and stop recording the show at a selected time after the show is scheduled to finish broadcasting. This increases the likelihood that an entire show will be recorded even if the digital VCR's clock is not perfectly synchronized to the broadcasting television station's clock or if the television show is broadcast a little early or a little late. When the user presses the Play button 404 to play back a show recorded in this manner, the digital VCR 10 can begin playing the show back beginning from the point at which the show was scheduled to be recorded, rather than from the actual beginning of the recording. For example, if a user schedules a show to be recorded from 9:00 pm through 9:30 pm, the digital VCR 10 can record beginning at 8:57 pm and stop recording at 9:33 pm. When the user presses the Play button 404 to play back the show, the digital VCR 10 can play back the recorded video stream beginning at the point in the video stream corresponding to 9:00 pm. The user can then rewind or fast forward the video stream to begin playback at the actual beginning of the show, as necessary.

By using information contained in the channel guide database 326 to determine when record criteria for a personal channel are met, and by periodically updating the channel guide database 326, the digital VCR 10 can record episodes of a television show even if the show is rescheduled after the personal channel is created. Similarly, the digital VCR can record episodes of a show that are aired on multiple live television channels. Furthermore, the digital VCR 10 can determine (by comparing channel guide information for a show that is scheduled to be recorded onto a personal channel with channel guide information for shows that are already recorded on a personal channel) that a show that is scheduled to be recorded onto a personal channel is already stored on the personal channel and/or has already been viewed by the user. In such a case the digital VCR 10 can cancel recording of the show.

When the digital VCR 10 records a scheduled show, the digital VCR can notify the user that the show has been recorded. For example, the digital VCR can notify the user with an on-screen display, by sending the user an e-mail message (using, e.g., the modem 148), using an audible signal (e.g., "A new show has been recorded), or by a pager message over a broadcast pager network.

Associated with each personal channel is a channel number in the channel list. For example, as shown in FIG. 5, the "Finance" channel is assigned channel number 1010, and is displayed in the channel list display 502 like any other channel. To watch the content that has been recorded on a personal channel, the user tunes to the personal channel's channel number using the remote control 22, or selects the personal channel's channel number in the channel list display 502. To watch a particular episode recorded on a personal channel, the user can select the episode in the show list display 504 using the cursor keys 460-466. For example, when the user first tunes to the "Finance" personal channel, the first episode recorded on the channel (i.e., the episode of "Moneyline" recorded on June 1 at 9 pm) begins playing back from the beginning. If the user stops watching the "Finance" personal channel and subsequently returns to the "Finance" personal channel, display begins where the user was last viewing.

Each personal channel has a name. The name can be specified by the user, or can be automatically generated by the digital VCR 10. For example, when the user creates a personal channel, the digital VCR 10 can use the name of the current show (derived from the channel guide database 326) as the name of the personal channel, or the digital VCR 10 can generate a name for the personal channel based on the personal channel's record criteria.

Record criteria for a personal channel can include criteria such as show title, keyword (e.g., actor, director), show category, description text, and rating. For example, a user can specify that all shows named "National Geographic" be recorded on a personal channel. A show name can be selected by entering the name of the show using real or virtual alphanumeric keys, by selecting a show from the Channel Guide grid, by selecting a show name from an alphabetized list of every known show in the channel database, or by selecting a show name from a hierarchical directory of shows. Record criteria can be combined by, for example, using boolean operators such as "and" and "or." An actor or director name can be selected using real or virtual alphanumeric keys, by selecting an actor or director name from a list of every actor or director in the channel database, or by selecting an actor or director name from a movie listing in the channel guide display 500. Topics can be selected from a list of all topics available in the channel database or from a hierarchical directory of topics or show categories.

Other record criteria can be specified for a personal channel. For example, the user can specify a record stack size for a personal channel. When a new show is to be recorded on a personal channel, if the personal channel already contains more video content than specified by the record stack size, the oldest show in the personal channel is replaced with the new show to be recorded. The user can specify a record priority for a personal channel. When a new show is to be recorded on a personal channel, if the hard disk drive 142 is full and a recording with a lower priority than the record priority exists in the personal channel, then the lower-priority show is deleted to make room for the new show to be recorded. Similarly, the user can specify that the oldest content recorded on a personal channel be deleted when necessary to make room for new content.

The user can specify ratings for a personal channel, such as movie ratings or show quality ratings, in which case only shows with the specified ratings will be recorded on the personal channel. The user can specify that only shows which satisfy specified V-chip ratings are to be recorded on the personal channel. The system can gather v-chip information from the VBI signal to determine whether a show satisfies the selected ratings or not. The user can specify a rerun preference for a personal channel which determines which combination of new broadcasts, reruns, and syndicated re-runs of a show will be recorded on the personal channel. For example, the user can specify that reruns of a show are not to be recorded. Similarly, the user can specify that only shows that the user has not previously viewed and/or recorded should be recorded. The digital VCR 10 can determine which shows the user has previously viewed by storing channel guide information for each show that the user watches.

The channel guide information received by the digital VCR 10, or the video streams received by the digital VCR 10, can include segment information describing segments of television shows. For example, segment information for a news broadcast might indicate where each news story in the broadcast begins and ends, and might include descriptive information (e.g., keywords) describing the content of the news stories. If the segment information for a segment matches the record criteria for a personal channel, the digital VCR 10 can record the segment onto the personal channel.

The user can specify the quality (in, e.g., megabits per second) at which content should be recorded on a personal channel. The user can also specify that a particular number of episodes of a show are to be recorded on a personal channel. When a personal channel is created, the user can be notified of the hard disk space that will be needed to store all shows that are scheduled to be recorded on the personal channel. If the amount of room needed exceeds the available space on the hard disk drive 142, the user can be given the option of canceling creation of the personal channel or, for example, deleting existing content to make room for the personal channel.

Matches between the record criteria specified for a personal channel and the information contained in the channel database can be made either by requiring an exact match or on a "fuzzy match" basis. A "fuzzy match" algorithm might allow, for example, matches between words with similar but not identical spellings. Record criteria can be compared against closed captioning data in addition to or instead of channel guide information. For example, if the user includes the word "apple" as a search criterion, the digital VCR 10 can record content whose closed captioning data includes the word "apple." In such a situation, the digital VCR 10 can record the entire show in which the word "apple" appears or can, for example, record a portion of the show surrounding the occurrence of the word "apple."

The digital VCR 10 can be manufactured or otherwise pre-configured with one or more personal channels. For example, the digital VCR 10 can contain a pre-configured "Finance" channel for recording all episodes of "Moneyline" and "Your Money." The digital VCR 10 can also create personal channels automatically based on demographic data provided by the user or based on the user's viewing habits as observed by the digital VCR 10. For example, the digital VCR 10 can create a personal channel for recording all sporting events occurring in the user's geographic region based on the zip code provided by the user during initial configuration, or from information contained in content broadcast (or otherwise sent) to the digital VCR 10 (e.g., in channel guide information). The digital VCR 10 can also, for example, create a "Seinfeld" personal channel if the user regularly watches and/or records episodes of "Seinfeld."

TV shows can be scheduled to be recorded in other ways. For example, the user can specify a show to be recorded on a personal channel by specifying the show's start time, end time, live television channel, and a recording quality. The digital VCR 10 can keep track of television shows that the user watches regularly. After identifying such shows, the digital VCR 10 can ask the user whether future episodes of such shows should be recorded, or the digital VCR 10 can automatically schedule future episodes of such shows to be recorded on one or more personal channels. Similarly, the digital VCR can identify shows that can be of interest to the user by, for example, comparing channel guide information for upcoming shows to channel guide information for shows that the user has previously watched and/or recorded.

After a show has been recorded, the user can be notified by, for example, an on-screen message, an e-mail message, or a notification through a pager network. The user can view information about shows that are scheduled to be recorded, shows that are currently being recorded, and shows that have been recorded.

When the user tunes to a personal channel, the on-screen display 508 can appear and a brief on-screen message can appear indicating that the show being viewed was previously recorded. After the user finishes watching a recorded episode, the user can be presented with a visual prompt asking the user if the episode should be deleted from the personal channel.

When a personal channel is being viewed, the user can cause the on-screen display 508 to appear on the screen by pressing the Display button 448 on the remote control 22. Pressing the Replay Guide button 454 while a personal channel is being viewed brings up the channel guide display 500, in which only personal channels and the content recorded on them are displayed. The user can select an episode and press the Play button 404 on the remote control 22 to begin playing back the episode either at the beginning of the episode or at the point in the episode where the user previously stopped viewing. The user can select a show by highlighting the show using the cursor keys 422-438 and pressing the select button 456, causing a menu to appear including choices including "Delete selected episode," "Delete all recorded episodes," and "Delete viewed portions of recorded episodes." The user can select a menu choice using the cursor keys 422-438 and the Select button 456. On-screen menus can also display a list of episodes that are scheduled to be recorded on the personal channel. The personal channel can be deleted or temporarily disabled using the on-screen menus.

The user configures the digital VCR 10 before its first use. The first part of configuration includes physically connecting all desired video and audio sources to the digital VCR's video and audio inputs, and connecting the digital VCR's video and audio outputs to a video and audio output devices such as the television 18 and speakers. It can be necessary to configure the remote control 22 to work properly with devices that are connected to the digital VCR 10. Users can also enter additional information such as their zip code, time zone, area code, and cable TV or DBS provider. After the user has entered all necessary information, the digital VCR 10 can scan all channels from connected live video sources and generate the channel list, discarding channels that do not contain a usable signal. The channel list can include channels representing recorded video sources, such as the VCR 15.

An initial channel guide database 326 can be generated by downloading channel guide information into the digital VCR 10 using the modem 148, cable TV cable 12, or some other means. Channel guide information can be downloaded only for those channels which the user receives. For example, if the user only subscribes to channels 1-20 from a cable television provider, the digital VCR 10 can download channel guide information from the cable service provider only for channels 1-20, rather than for the entire set of channels provided by the cable service provider. Subsequently, the channel guide database 326 can periodically be updated by the digital VCR 10 by downloading updated channel guide information. The user can specify times at which the channel guide database 326 is to be updated.

An internal clock within the digital VCR 10 can be set to the current time manually, or the internal clock can be set automatically using, for example, information contained within downloaded channel guide information. As part of initial configuration, the digital VCR 10 can display a tutorial video contained on the hard disk drive 142 containing usage instructions. The tutorial video can be displayed automatically the first time the digital VCR 10 is configured. The tutorial video can be deleted after being watched by the user, either automatically or in response to user instruction.

The user can optionally perform additional configuration. For example, after an initial channel list has been generated, the user can modify the association of channel numbers in the channel list with channels received from the connected live video sources. For example, the user can specify that channel 1 in the channel list is to be associated with channel 7 from a connected television antenna and that channel 2 in the channel list is to be associated with channel 23 from a connected cable TV cable. In this way, the user can, for example, place the most frequently-used channels together at the beginning of the channel list. The user can add or delete channels from the channel list.

The user can block access to specified channels using a specified password in order to prevent children from watching inappropriate channels, for example. Blocked channels are skipped when accessed sequentially, but cause an on-screen message (e.g., "This channel is blocked: Please enter password.") to be displayed if the blocked channel is tuned to directly.

As described in more detail below, the digital VCR 10 always spools the current show to a rewind buffer that is stored on the hard disk 142. The user can configure the length of the rewind buffer, which can be, for example, 15 minutes long by default. The user can specify default recording qualities with which shows are to be recorded into the rewind buffer and into personal channels.

The user can watch live television using the digital VCR 10 by tuning to a live television channel using the remote control 22. For example, the user can tune directly to a live television channel by entering the channel number using numeric keys 422-238 on the remote control 22, by using Channel Up button 418 and Channel Down button 420 on the remote control 22, or by selecting a channel in the channel guide display 500. The digital VCR 10 continuously spools the current show's video and audio streams to a rewind buffer stored on the hard disk drive 142. The current show is spooled to the rewind buffer even if the user is not watching the current show, such as when the user is watching a VHS tape. The digital VCR 10 can have a second tuner in addition to the tuner 108, in which case one live television channel (referred to as a primary channel) can be spooled to the rewind buffer while the user watches a secondary live television channel. Similarly, if channel guide information is broadcast on the VBI of a single television channel, channel guide information can be received on one television channel while the user is viewing another live television channel.

Whenever the user tunes to a channel by, for example, pressing the Channel Up button 418 or Channel Down button 420 on the remote control 22, the channel number and station description or channel name are displayed transparently over the channel's video stream. The station's call letters can be retrieved from the VBI Extended Data Service (XDS or EDS) information or from the channel guide database 326. Show information, such as the name of the show being viewed and the amount of time left, can also be displayed. The on-screen display can last for a few seconds and then be removed. If the channel is being recorded, the channel's underlying video and audio streams are recorded without the transparent station description and/or channel name. Similarly, other transparent displays described herein (e.g., the channel guide display 500) are not recorded even when the video over which they are displayed is recorded. However, the information itself is typically recorded along with the video stream for database storage and subsequent retrieval and display.

Whenever the user is watching any channel, the digital VCR 10 is in one of several "interface states" that define what options the user has. The current interface state depends on what type of channel is being viewed and on whether the system is recording a personal channel. The name of the current interface state can be displayed transparently over the currently playing video stream for a few seconds whenever the current interface state changes. The interface states include:

Live: a live television channel is being displayed and being recorded into the rewind buffer.

Delayed: part of a recorded show is playing back from the rewind buffer while the remainder of the show is being recorded.

Personal: a pre-recorded personal channel is playing back from storage.

Recording: a channel is being viewed while being recorded for subsequent or simultaneous playback.

Non-viewable: the selected channel cannot be displayed.

Information: a non-video channel designed to present information, advertising, or web-style menus.

Figure 6A:
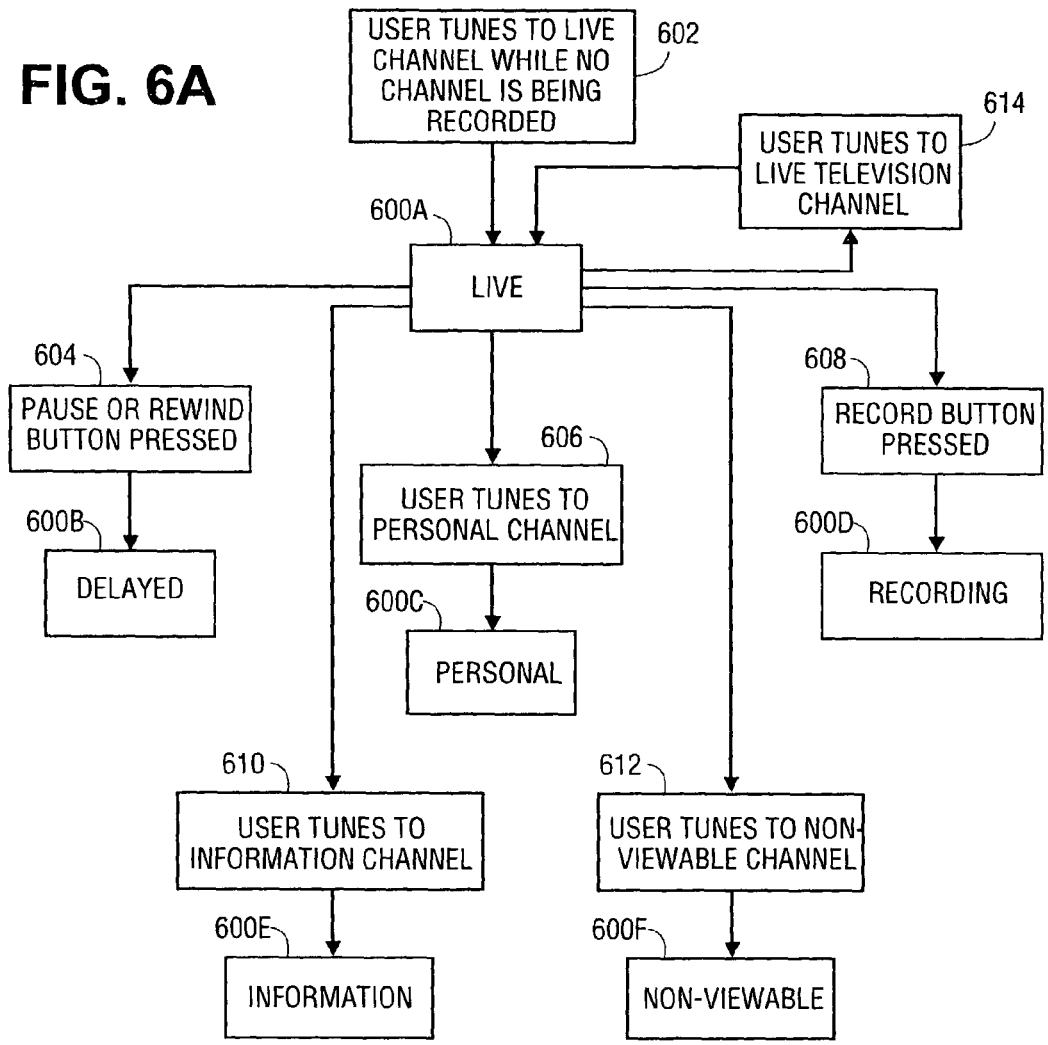

Referring to FIGS. 6A-F, transitions between interface states occur as follows. Referring to FIG. 6A, when the user tunes to a live television channel while no channel is being recorded onto a personal channel (step 602), the interface state becomes Live 600*a*. When the interface state is Live, the show being displayed on the current channel is recorded into the rewind buffer. During the Live interface state, the user can use the Channel Up button 418 and Channel Down button 420 on the remote control 22 to change the current channel, and can tune directly to a channel by entering the channel number using the numeric keys 422-238 on the remote control 22. If the user tunes to a personal channel (step 606), the personal channel is displayed and, the interface state becomes Personal 600*c*. If the user tunes to an information channel (step 610), the information channel is displayed and the interface state becomes Information 600*e*. If the user tunes to a non-viewable channel (step 612), a message is displayed on-screen notifying the user that the channel is non-viewable and the interface state becomes Non-Viewable 600*f*.

Pressing the Record button 408 on the remote control 22 during the Live interface state (step 608) can cause the digital VCR 10 to display an on-screen menu from which the user can choose to record either the current episode of the current show or all episodes of the current show.

Alternatively, for example, pressing the Record button 408 during the Live interface state can cause the digital VCR 10 to begin recording the current show, and pressing the Record button 408 again can cause the digital VCR 10 to schedule recording of all upcoming episodes of the current show. In any case, after pressing the Record button 408, the digital VCR 10 (1) assigns a personal channel to the current channel; (2) saves the data that has been recorded in the rewind buffer, so that the entire show being viewed on the current channel can be recorded, and (3) changes the interface state to Recording 600*d*. The digital VCR 10 can ask the user whether to record a single episode of the current show or all future episodes of the current show. If all future episodes of the current show are to be recorded, the digital VCR 10 can schedule recording of future shows by, for example, using the channel guide database 326 to determine which show is currently being broadcast and then scheduling future episodes of the same show to be recorded.

Pressing the Rewind button 402 on the remote control 22 during the Live interface state (step 604): (1) rewinds the video that has been recorded in the rewind buffer, while the current show continues to be recorded into the rewind buffer, and (2) changes the interface state to Delayed 600*b*. Pressing the Rewind button 402 again or the Play button 404 initiates delayed playback of the content stored in the rewind buffer. Pressing the Pause button 402 on the remote control 22 during the Live interface state (step 604) causes the currently displayed frame to be frozen on-screen while the current show continues to be recorded into the rewind buffer, and changes the interface state to Delayed 600*b*.

Referring to FIG. 6B, when the interface state is Delayed, the current show continues to be recorded into the rewind buffer. When the interface state is Delayed, the user can attempt to change channels using the Channel Up button 418 or the Channel Down button 420 on the remote control 22. If the user attempts to tune to a live television channel and the digital VCR 10 has only one tuner, the user can be presented with a message saying that a delayed show is being viewed and instructing the user that the Live TV button 412 must be pressed to change to the Live interface state in order to change channels. Alternatively, if the user attempts to tune to a live television channel and the digital VCR 10 has only one tuner (step 616), the digital VCR 10 can display the channel number onscreen and change the interface state to Non-Viewable. If the user tunes to a personal channel (step 618), the selected personal channel can become the current channel and the interface state becomes Personal. If the user presses the Rewind or Fast Forward button 406 during the Delayed interface state, the delayed video will be rewound or fast forwarded, respectively. If the user presses the Pause button 410 during the Delayed interface state, the delayed video being displayed is paused. If the user presses the Play button 404 during the Delayed interface state while the delayed video is paused, the delayed video will resume playing at the point at which the video was paused. In the latter case, the video can resume playing at normal speed, or at an increased rate in order to let the user "catch up" with the content currently being broadcast. If the user presses the Live TV (Stop) button 412 during the Delayed interface state (step 620), the current show will be displayed at the current time, and the interface state becomes Live. Pressing the Record button 408 during the Delayed interface state (step 622) causes the Rewind buffer to be saved and the interface state to become Recording. The user can record a single episode or all episodes of the current show as described above.

Figure 6C:
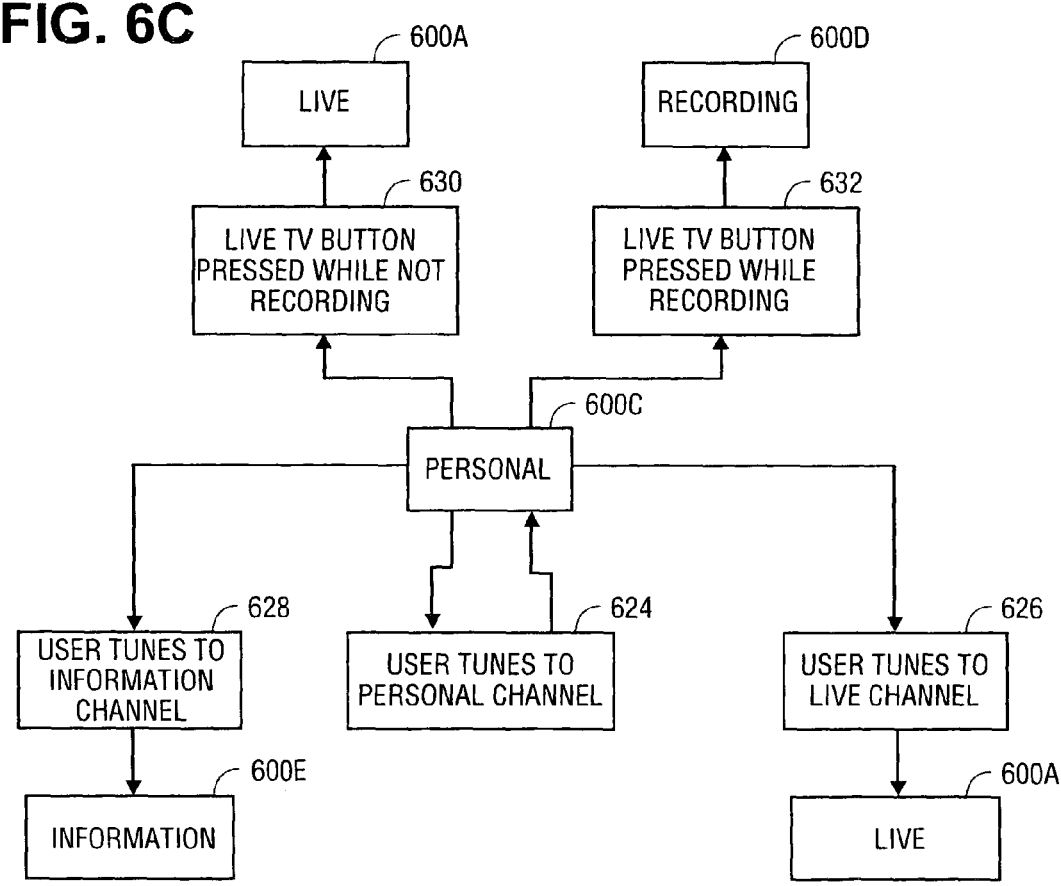

Referring to FIG. 6C, when the user is playing back a show that has been completely recorded on a personal channel, the interface state is Personal. This differs from the Recording interface state, which corresponds to watching a show that is still in the process of being recorded. When the interface state is Personal, the digital VCR 10 can either be recording a show from any channel or not recording. When the interface state is Personal, the user can tune to another channel using the Channel Up button 418 and Channel Down buttons 420 or by directly tuning to a channel using the numeric keys 422-438. If the current channel is changed from a personal channel while a live television program is being viewed and being recorded onto the personal channel, the current position of the live television program is stored for future use while the program continues to be recorded onto the personal channel. This allows the user to return to the personal channel and continue watching the television program from the point where the user left off. If, while in the Personal interface state, the user tunes to another personal channel (step 624), the interface state remains Personal. If the user tunes to a live television channel (step 626), the interface state becomes Live. If the user tunes to an Information Channel (step 628), the interface state becomes Information.

Pressing the Rewind button 402, Fast Forward button 406, or Pause button 410 while in the Personal interface state causes the personal channel being viewed to rewind, fast forward, or pause, respectively. If the Play button 404 is pressed while the personal channel is paused, the personal channel continues playing from the point at which it was paused. If the Play button 404 is pressed while the personal channel is playing, the replay guide is displayed. If the Live TV (Stop) button 412 is pressed while in the Personal interface state 600*c* and the digital VCR 10 is not recording a personal channel (step 630), the digital VCR 10 tunes to the last viewed live television channel, and the interface state becomes Live. If the Live TV (Stop) button 412 is pressed during the Personal interface state and the digital VCR 10 is recording a personal channel (step 632), the digital VCR 10 tunes to the channel that is being recorded, and the interface state becomes Recording.

Referring to FIG. 6D, when the digital VCR 10 is recording a show that the user has specifically requested to be recorded (in contrast to recording a show into the rewind buffer), the interface state is Recording. If the digital VCR 10 finishes recording the show while in the Recording interface state (step 634), the interface state changes to Live. If the user presses the Channel Up button 418 or Channel Down button 420 while in the Recording interface state, the current channel changes to the next or the previous viewable channel. While in the Recording interface state, a live television channel cannot be viewed if the digital VCR 10 has only one tuner. Therefore, while in the Recording interface state, live television channels can not be viewable. Pressing the Channel Up button 418 or Channel Down button 420 can therefore skip unviewable channels and display the next or previous viewable channel, respectively. Alternatively, if the user tunes to a non-viewable channel while in the Recording interface state (step 636), the digital VCR 10 can display the channel number of the non-viewable channel on-screen and change the interface state to Non-Viewable.

If the user tunes to a personal channel while in the Recording interface state (step 638), the interface state becomes Personal. If the user tunes to an information channel while in the Recording interface state (step 640), the interface state becomes Information.

Pressing the Rewind, Fast Forward, and Pause keys while in the Recording interface state perform rewind, fast forward, and pause functions, respectively.

If the user presses the Play button 404 during the Recording interface state and the current channel is paused, the current channel will resume playing. If the user presses the Live TV (Stop) button 412 during the Recording interface state (step 642), the current channel will be displayed at the current time and the interface state will become Live, allowing the user to watch live television.

Figure 6E:
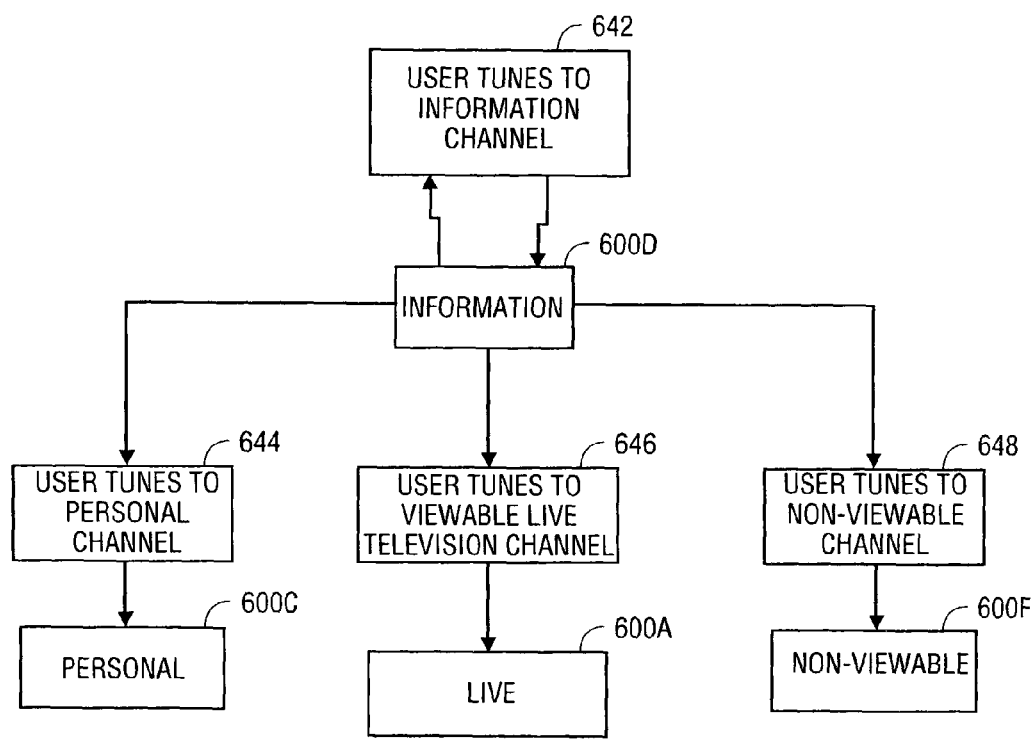

The digital VCR 10 can reserve one or more channels, referred to as "information channels," for displaying information to the user. For example, an information channel can display an advertisement, notice, or e-mail to the user. Referring to FIG. 6E, when an information channel is being displayed, the interface state is Information. If the user tunes to an information channel while in the Information interface state (step 642), the interface state remains Information. If the user tunes to a personal channel while in the Information interface state (step 644), the digital VCR 10 tunes to the personal channel and the interface state becomes Personal. If the user tunes to a viewable live television channel while in the Information interface state (step 646), the digital VCR 10 tunes to the live television channel and the interface state becomes Live. If the user tunes to a non-viewable channel while in the Information interface state (step 648), the interface state becomes Non-Viewable.

Figure 6F:
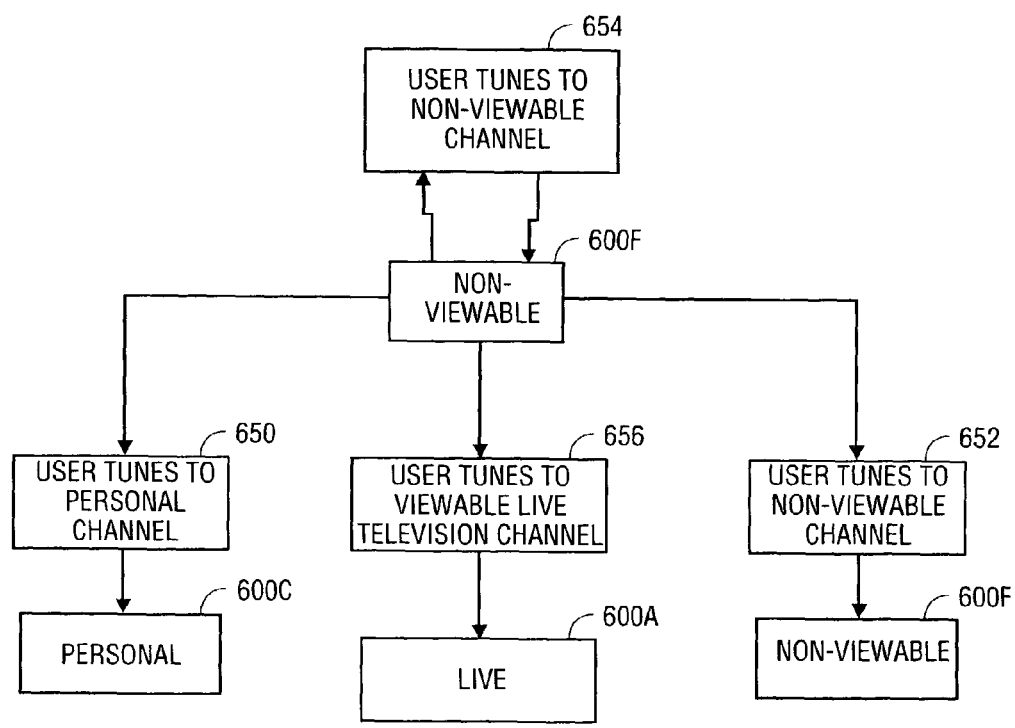

Referring to FIG. 6F, if the user tunes to a channel that cannot be displayed for any of a number of reasons, the interface state becomes Non-Viewable. For example, if the digital VCR 10 has only one tuner, and the user tunes to a live television channel while another channel is being recorded, the interface state becomes Non-Viewable. When in the Non-Viewable interface state, the channel guide information for the non-viewable channel can be displayed on the on-screen display 508 against a dark background along with a message telling the user why the current channel cannot be viewed. Alternatively, if the user attempts to tune to a channel that is non-viewable because another channel is being recorded, the digital VCR 10 can provide the user with the option of canceling the recording of the channel that is being recorded.

If the user presses the Channel Up button 418 or Channel Down button 420 while in the Non-Viewable interface state, the current channel will be changed to the next or previous viewable channel, respectively. If the user tunes to a personal channel while in the Non-Viewable interface state (step 650), the digital VCR 10 tunes to the personal channel and the interface state becomes Personal. If the user tunes to an information channel while in the Non-Viewable interface state (step 652), the digital VCR 10 displays the information channel and the interface state becomes Information. If the user tunes to a non-viewable channel while in the Non-Viewable interface state (step 654), the interface state remains Non-Viewable. If the user tunes to a viewable live television channel while in the Non-Viewable interface state (step 656), the digital VCR 10 tunes to the live television channel and the interface state becomes Live. If the user presses the Play button 404 while the interface state is Non-Viewable, the replay guide is displayed.

If the user presses the Channel Up button 418 or Channel Down button 420 while in the Play Menu interface state, a graphical show selector is moved up or down, respectively, allowing the user to select a personal channel to watch. The Cursor Up button 460 and Cursor Down button 462 perform the same functions as the Channel Up button 418 and Channel Down button 420, respectively. The Select button 256 chooses the selected personal channel as the current channel and begins playing the personal channel.

If the digital VCR 10 has two tuners, the user can designate a channel to be a "primary channel." If, for example, the user is watching a channel that has been designated as a primary channel, the content of the channel is spooled to the rewind buffer. If the user tunes to another channel, the contents of the primary channel continue to be spooled to the rewind buffer. The channel to which the user tunes can be spooled to a second rewind buffer. When the user returns to the primary channel, the user can resume watching the primary channel at the point where the user left off or at the current time. In the latter case the user can rewind the primary channel in order to view portions of the primary channel content that were received while the user was watching other channels. Furthermore, if the user is viewing a channel other than the primary channel, the digital VCR 10 can notify the user when the end of a commercial or the end of a series of commercials have been detected on the primary channel.

The techniques described above can be implemented in special-purpose circuitry, general-purpose circuitry (such as programmable microprocessors) operating under the control of program instructions, or in any combination of such apparatus. However, the techniques are not limited to any particular circuitry or program configuration; they can find applicability in any computing or processing environment that can be used for digital recording and playback of video and audio streams. The techniques can be implemented in computer programs executing on programmable circuitry that can include a processor, a storage medium readable by the processor (including volatile or non-volatile memory and/or storage elements), one or more input device, and one or more output devices. Program code can be applied to data entered using the input device to perform the functions described and to generate output information. The output information can be applied to the one or more output devices.

Each program described above can be implemented in a high level procedural or object oriented programming language to communicate with a computer system. However, the programs can be implemented in assembly or machine language, if desired. In any case, the language can be a compiled or interpreted language.

Each such program can be stored on a storage medium or device (e.g., DVD, CD-ROM, hard disk or magnetic diskette) that is readable by a general or special purpose programmable computer for configuring and operating the computer when the storage medium or device is read by the computer to perform the procedures described in this document. The system can also be considered to be implemented as a computer-readable storage medium, configured with a computer program, where the storage medium so configured causes a computer to operate in a specific and predefined manner.

The present invention has been described in terms of an embodiment. The invention, however, is not limited to the embodiment depicted and described. Rather, the scope of the invention is defined by the claims.

Other embodiments are within the scope of the claims. For example, the digital VCR 10 can have one or more tuners in addition to the tuner 108. Such additional tuners can allow the user to, for example, watch one live television channel while another live television channel is being recorded. The digital VCR 10 can receive audio and/or video in digital form. Any digital audio or video received by the digital VCR 10 need not be digitized by the decoder 109 or the codec 124. Video can be received in NTSC, PAL, HDTV, or any other broadcast standard format. The digital VCR 10 can display video output on a high-definition television (HDTV). If the digital VCR 10 displays output on an HDTV or another digital video output device, the digital VCR 10 need not be converted into analog form before being output. Channel guide information can be received by, for example, the modem 148 or from the VBI. Video can be output in component video format. Digital audio can be output in formats other than SPDIF. The digital VCR 10 can include a DBS tuner to allow the digital VCR to perform the functions of a DBS receiver.

What is claimed is:

1. A method, comprising:
receiving a first media stream and a second media stream;
designating the first media stream as a primary media stream;
after designating the first media stream as the primary media stream, storing the first media stream in a storage medium;
displaying the received first media stream while continuing to receive the first media stream and the second media stream and continuing to store the first media stream in a storage medium;
in response to an input, displaying the second media stream instead of the first media stream while the first media stream continues to be stored;
marking a point in the first media stream at which displaying of the second media stream started; and
resuming display of the first media stream instead of the second media stream at the point marked in the first media stream, wherein resuming display of the first media stream comprises resuming display of the first media stream while the received first media stream continues to be stored.

2. The method of claim 1, wherein the first media stream and/or the second media stream comprise commercially broadcast media stream(s).

3. The method of claim 1, wherein the first media stream and/or the second media stream comprise program(s).

4. The method of claim 1, wherein the first media stream and/or the second media stream comprise any combination of video signals and audio signals.

5. The method of claim 1, wherein the storage medium comprises a random access memory accessible permanent storage device, a storage disk, and/or a magnetic disk.

6. The method of claim 1, wherein the displaying comprises displaying a media stream obtained from a random access memory (RAM), a memory buffer, a memory cache, a RAM accessible permanent storage device, a storage disk, and/or a magnetic disk drive.

7. An apparatus, comprising:
a receiver having multiple tuners to input at least a first media stream and a second media stream;
a storage medium coupled with the receiver to store at least the first and/or second media stream(s);
a replayer coupled with the storage medium to play back one of the first and second media streams while a media stream continues to be received;
a switch coupled with the receiver, the replayer, and a display to designate display of one of the first and second media streams; and
a marker to track a point in the first and/or second media streams at which display of the first and/or second media streams is resumable,
wherein the apparatus is configured to designate a media stream as a primary media stream, and to store the primary media stream in the storage medium after a media stream has been designated as the primary media stream, and
wherein the apparatus is further configured to generate a notification that a commercial has ended on the second media stream while the switch is configured to designate the first media stream for display.

8. The apparatus of claim 7, wherein:
the receiver inputs the first and the second media streams;
the storage medium holds the first media stream;
the switch designates display of the first media stream; and
the replayer plays back the first media stream while the first media stream continues to be stored.

9. The apparatus of claim 7, wherein the switch designates display of the second media stream instead of the first media stream while the first media stream continues to be stored.

10. The apparatus of claim 9, wherein the marker tracks the point in the first media stream corresponding to a beginning of the display of the second media stream.

11. The apparatus of claim 10, wherein the replayer resumes display of the first media stream at the point.

12. The apparatus of claim 7, wherein the first media stream and/or the second media stream comprise commercially broadcast media stream(s).

13. The apparatus of claim 7, wherein the first media stream and/or the second media stream comprise program(s).

14. The apparatus of claim 7, wherein the first media stream and/or the second media stream comprise any combination of video signals and audio signals.

15. The apparatus of claim 7, wherein the storage medium comprises a random access memory accessible permanent storage device, a storage disk, and/or a magnetic disk drive.

16. The apparatus of claim 7, wherein the replayer plays back a media stream obtained from a random access memory (RAM), a memory buffer, a memory cache, a RAM accessible permanent storage device, a storage disk, and/or a magnetic disk drive.

17. The apparatus of claim 7, wherein the apparatus is further configured to generate a notification that a commercial has ended on the first media stream while the switch is configured to designate the second media stream for display.

18. A method, comprising:
receiving a first media stream and a second media stream;
designating the first media stream as a primary media stream;
after designating the first media stream as the primary media stream, storing the first media stream in a storage medium;

displaying the received first media stream while continuing to receive the first media stream and the second media stream and continuing to store the first media stream in a storage medium;
in response to an input, displaying the second media stream instead of the first media stream while the first media stream continues to be stored;
while displaying the second media stream, generating a notification that a commercial on the first media stream has ended;
marking a point in the first media stream at which displaying of the second media stream started; and
resuming display of the first media stream instead of the second media stream at the point marked in the first media stream.

* * * * *